US007727915B2

(12) United States Patent
Skirius et al.

(10) Patent No.: US 7,727,915 B2
(45) Date of Patent: Jun. 1, 2010

(54) TACKY ALLERGEN TRAP AND FILTER MEDIUM, AND METHOD FOR CONTAINING ALLERGENS

(75) Inventors: Stephen A. Skirius, Collierville, TN (US); John H. Roberts, Memphis, TN (US); Brian Boehmer, Cordova, TN (US); Laurence A. Moose, Jr., Bartlett, TN (US); Namitha R. Sundara, Memphis, TN (US)

(73) Assignee: Buckeye Technologies Inc., Memphis, TN (US)

( * ) Notice: Subject to any disclaimer, the term of this patent is extended or adjusted under 35 U.S.C. 154(b) by 65 days.

(21) Appl. No.: 11/624,580

(22) Filed: Jan. 18, 2007

(65) Prior Publication Data

US 2007/0175195 A1    Aug. 2, 2007

Related U.S. Application Data

(60) Provisional application No. 60/760,323, filed on Jan. 18, 2006, provisional application No. 60/880,873, filed on Jan. 16, 2007.

(51) Int. Cl.
| | |
|---|---|
| *B32B 27/04* | (2006.01) |
| *B32B 27/06* | (2006.01) |
| *B32B 27/12* | (2006.01) |
| *B32B 23/02* | (2006.01) |
| *B32B 23/10* | (2006.01) |
| *B01D 39/14* | (2006.01) |

(52) U.S. Cl. .................. 442/389; 442/151; 442/271; 442/272; 442/274; 442/277; 442/278; 442/281; 442/283; 442/284; 442/381; 442/385; 442/415; 442/416; 442/417; 428/343; 55/524; 55/527; 55/528

(58) Field of Classification Search ....................... None
See application file for complete search history.

(56) References Cited

U.S. PATENT DOCUMENTS

| 2,832,745 | A | | 8/1958 | Hechenbleikner |
| 2,955,962 | A | * | 10/1960 | Engdahl ..................... 442/151 |
| D200,773 | S | | 4/1965 | Anderson |
| 3,259,536 | A | | 7/1966 | Gaeth et al. |

(Continued)

FOREIGN PATENT DOCUMENTS

EP    0070164 A    1/1983

(Continued)

OTHER PUBLICATIONS

Morphology of Wood Pulp Fiber from Softwoods and Influence on Paper Strength; Richard A. Horn; U.S. Department of Agriculture, Forest Service, Research paper; FPL 242; (1974).

(Continued)

*Primary Examiner*—Jennifer A Chriss
(74) *Attorney, Agent, or Firm*—Baker Botts L.L.P.

(57) ABSTRACT

An allergen trap is provided. The allergen trap includes a woven or nonwoven substrate having at least one strata. The trap is impregnated with or otherwise treated with a tacky adhesive by which allergens may be trapped. An example of an allergen is a dust mite. The tacky adhesive, in turn, may be treated with a miticide or activated carbon.

25 Claims, 14 Drawing Sheets

U.S. PATENT DOCUMENTS

| | | | |
|---|---|---|---|
| 3,424,270 A | 1/1969 | Hartman et al. |
| 3,429,728 A | 2/1969 | Goldstone et al. |
| 3,485,706 A | 12/1969 | Evans |
| 3,536,557 A | 10/1970 | Goldstone et al. |
| 3,844,812 A | 10/1974 | Leonard et al. |
| 3,844,813 A | 10/1974 | Leonard et al. |
| 3,955,032 A | 5/1976 | Mischutin |
| 4,026,808 A | 5/1977 | Duffy |
| 4,035,215 A | 7/1977 | Goldstone |
| 4,056,161 A | 11/1977 | Allen |
| 4,131,664 A | 12/1978 | Flowers et al. |
| 4,324,831 A | 4/1982 | Parrini et al. |
| 4,420,526 A | 12/1983 | Schilling et al. |
| 4,442,164 A | 4/1984 | Briggs et al. |
| 4,568,581 A | 2/1986 | Peoples, Jr. |
| 4,600,606 A | 7/1986 | Mischutin |
| 4,702,861 A | 10/1987 | Farnum |
| 4,776,854 A | 10/1988 | Ogawa et al. |
| 4,851,283 A | 7/1989 | Holtrop et al. |
| 4,851,291 A | 7/1989 | Vigo et al. |
| 4,874,451 A | 10/1989 | Boger et al. |
| 4,966,799 A | 10/1990 | Lucca et al. |
| 5,050,256 A | 9/1991 | Woodcock |
| 5,051,110 A | 9/1991 | Borrell et al. |
| 5,055,341 A | 10/1991 | Yamaji et al. |
| 5,064,714 A | 11/1991 | Yamaguchi et al. |
| 5,068,001 A | 11/1991 | Haussling |
| 5,141,784 A | 8/1992 | Beane et al. |
| 5,200,457 A | 4/1993 | Vasishth et al. |
| 5,246,772 A | 9/1993 | Manning |
| 5,266,143 A | 11/1993 | Albera et al. |
| 5,286,929 A | 2/1994 | Kazama et al. |
| 5,296,657 A | 3/1994 | Gilliland et al. |
| 5,321,861 A | 6/1994 | Dancey et al. |
| 5,379,568 A | 1/1995 | Murray |
| 5,401,793 A | 3/1995 | Kobayashi et al. |
| 5,422,170 A | 6/1995 | Iwata et al. |
| 5,491,186 A | 2/1996 | Kean et al. |
| 5,492,881 A | 2/1996 | Diamond |
| 5,516,580 A | 5/1996 | Frenette et al. |
| 5,554,831 A | 9/1996 | Matsukawa et al. |
| 5,591,289 A | 1/1997 | Souders et al. |
| 5,646,077 A | 7/1997 | Matsunaga et al. |
| 5,695,528 A | 12/1997 | Komori et al. |
| 5,707,434 A | 1/1998 | Halloran et al. |
| 5,721,281 A | 2/1998 | Blount |
| 5,773,375 A | 6/1998 | Swan et al. |
| 5,811,359 A | 9/1998 | Romanowski |
| 5,817,408 A | 10/1998 | Orimo et al. |
| 5,841,081 A | 11/1998 | Thompson et al. |
| 5,843,559 A | 12/1998 | Cadieux et al. |
| 5,886,306 A | 3/1999 | Patel et al. |
| RE36,323 E | 10/1999 | Thompson et al. |
| 5,971,099 A | 10/1999 | Yasuda et al. |
| 6,017,601 A | 1/2000 | Amsel |
| 6,102,465 A | 8/2000 | Nemoto et al. |
| 6,109,389 A | 8/2000 | Hiers et al. |
| 6,145,617 A | 11/2000 | Alts |
| 6,153,668 A | 11/2000 | Gestner et al. |
| 6,271,156 B1 | 8/2001 | Gleason et al. |
| 6,296,075 B1 | 10/2001 | Gish et al. |
| 6,296,076 B1 | 10/2001 | Hiers et al. |
| 6,297,176 B1 | 10/2001 | North et al. |
| 6,309,565 B1 | 10/2001 | Stowell et al. |
| 6,336,948 B1 | 1/2002 | Inoue et al. |
| 6,358,591 B1 | 3/2002 | Smith |
| 6,419,729 B1 * | 7/2002 | Duffy et al. ............ 96/17 |
| 6,475,315 B1 | 11/2002 | Kean et al. |
| 6,524,691 B2 | 2/2003 | Sugawara et al. |
| 6,534,145 B1 | 3/2003 | Boyles |
| 6,617,382 B1 | 9/2003 | Pirig et al. |
| 6,631,785 B2 | 10/2003 | Khambete et al. |
| 6,667,254 B1 | 12/2003 | Thompson, Jr. et al. |
| 6,669,265 B2 | 12/2003 | Tilton et al. |
| 6,726,980 B2 | 4/2004 | Staelgraeve et al. |
| 6,746,974 B1 * | 6/2004 | Reiterer et al. ............ 442/101 |
| 6,802,389 B2 | 10/2004 | Tompson et al. |
| 6,893,711 B2 | 5/2005 | Williamson et al. |
| 7,000,729 B2 | 2/2006 | Jacobsen |
| RE39,010 E | 3/2006 | Gish et al. |
| 7,055,649 B2 | 6/2006 | Tompson et al. |
| 7,080,712 B2 | 7/2006 | Tsuiki et al. |
| 7,137,477 B2 | 11/2006 | Keller et al. |
| 7,150,059 B2 | 12/2006 | Small et al. |
| 7,157,117 B2 | 1/2007 | Mikhael et al. |
| 7,226,656 B2 | 6/2007 | Coates et al. |
| 2001/0051247 A1 | 12/2001 | Waitkus et al. |
| 2002/0042237 A1 | 4/2002 | Sameshima et al. |
| 2002/0137421 A1 | 9/2002 | Desroches et al. |
| 2002/0148047 A1 | 10/2002 | Corzani et al. |
| 2003/0012883 A1 | 1/2003 | Yu et al. |
| 2003/0106741 A1 | 6/2003 | Tompson et al. |
| 2003/0176131 A1 | 9/2003 | Tilton |
| 2003/0207639 A1 | 11/2003 | Lin |
| 2004/0023587 A1 | 2/2004 | Bargo, II |
| 2004/0028958 A1 | 2/2004 | Assink et al. |
| 2004/0050619 A1 | 3/2004 | Bargo |
| 2004/0097156 A1 | 5/2004 | McGuire et al. |
| 2004/0102112 A1 | 5/2004 | McGuire et al. |
| 2004/0110438 A1 | 6/2004 | Tompson et al. |
| 2004/0121114 A1 | 6/2004 | Piana et al. |
| 2004/0121691 A1 | 6/2004 | Klein |
| 2004/0163724 A1 | 8/2004 | Trabbold et al. |
| 2004/0176003 A1 | 9/2004 | Yang et al. |
| 2004/0180599 A1 | 9/2004 | Yang et al. |
| 2004/0192139 A1 | 9/2004 | Pallach et al. |
| 2004/0226100 A1 | 11/2004 | Small, Jr. et al. |
| 2004/0231915 A1 | 11/2004 | Thompson et al. |
| 2004/0238275 A1 | 12/2004 | Keller et al. |
| 2004/0248490 A1 | 12/2004 | Hyuga et al. |
| 2005/0014431 A1 | 1/2005 | Carmody et al. |
| 2005/0020159 A1 | 1/2005 | Zucker |
| 2005/0031819 A1 | 2/2005 | Mankell et al. |
| 2005/0066691 A1 | 3/2005 | Ruid et al. |
| 2005/0126848 A1 | 6/2005 | Siavoshai et al. |
| 2005/0132886 A1 | 6/2005 | Schultze et al. |
| 2005/0164582 A1 | 7/2005 | McGuire et al. |
| 2005/0210584 A1 | 9/2005 | Lim et al. |
| 2005/0227558 A1 | 10/2005 | Small et al. |
| 2005/0250406 A1 | 11/2005 | Wenstrup et al. |
| 2005/0269850 A1 | 12/2005 | York et al. |
| 2006/0000024 A1 | 1/2006 | McGuire et al. |
| 2006/0065482 A1 | 3/2006 | Schmidft et al. |
| 2006/0068675 A1 | 3/2006 | Handermann et al. |
| 2006/0090958 A1 | 5/2006 | Coates et al. |
| 2006/0105928 A1 | 5/2006 | Crooks et al. |
| 2006/0113146 A1 | 6/2006 | Khan et al. |
| 2006/0160454 A1 | 7/2006 | Handermann et al. |
| 2006/0228528 A1 | 10/2006 | Link et al. |
| 2006/0240217 A1 | 10/2006 | Foss et al. |
| 2006/0289231 A1 | 12/2006 | Priebe et al. |
| 2007/0014960 A1 | 1/2007 | Emanuel et al. |
| 2007/0048512 A1 | 3/2007 | Mikhael et al. |
| 2008/0008858 A1 | 1/2008 | Hong et al. |
| 2008/0054231 A1 | 3/2008 | Wenstrup et al. |
| 2008/0073146 A1 | 3/2008 | Thompson et al. |
| 2008/0082151 A1 | 4/2008 | Quincy et al. |

FOREIGN PATENT DOCUMENTS

| | | |
|---|---|---|
| EP | 0480724 | 4/1992 |
| EP | 1182087 A | 2/2002 |
| EP | 1612768 A | 1/2006 |
| EP | 1661503 | 5/2006 |

| | | |
|---|---|---|
| GB | 2237756 | 5/1991 |
| JP | 2000222852 A | 8/2000 |
| WO | WO89004886 | 6/1989 |
| WO | WO 9114496 A1 * | 10/1991 |
| WO | WO91014496 | 10/1991 |
| WO | WO92007985 | 5/1992 |
| WO | WO95026228 | 10/1995 |
| WO | WO 00/71790 | 11/2000 |
| WO | WO2004/086354 | 10/2004 |
| WO | WO2006/052581 | 5/2006 |
| WO | WO 2006/107847 | 10/2006 |

OTHER PUBLICATIONS

Non-final Office Action issued on March 9, 2010 on U.S. Appl. No. 11/779,751.

* cited by examiner

Particles captured at
end of 25-day test

Particles captured at
end of 25-day test

TACKY ALLERGEN TRAP AND FILTER MEDIUM, AND METHOD FOR CONTAINING ALLERGENS

CROSS-REFERENCE TO RELATED APPLICATIONS

This application claims priority under 35 U.S.C. §119, based on U.S. Provisional Application Ser. No. 60/760,323, filed Jan. 18, 2006, and U.S. Provisional Application Ser. No. 60/880,873, filed Jan. 16, 2007. The teachings of these referenced applications are incorporated herein by reference in their entireties.

FIELD OF THE INVENTION

The present invention relates to nonwoven materials. The invention further relates to nonwoven substrates which provide one or more allergen-retaining layers for trapping dust mites or other allergens into and out of cushioning material. The invention also relates to a process for the manufacture of a filtration medium employing a nonwoven substrate having at least one stratum bearing a tacky adhesive for trapping allergens.

BACKGROUND OF THE INVENTION

Some humans experience sensitivities or allergic reactions to airborne micro-particles. Such particles may be feline-spawned allergens such as cat dander. Other particles may be, for example, dust mites or the feces or exoskeleton of dust mites. Dust mites are of particular concern due to their propensity to propagate in cushioning materials such as mattresses, pillows and furniture cushions.

Dust mites are arachnids, and belong to the subclass acari. There are two common dust mites: the American house dust mite (*Dermatophagoides farinae*) and the European house dust mite (*D. pteronyssinus*). Dust mites feed on the dead skin that falls off the bodies of humans and animals and on other organic material found where they live. They are extremely small, being only about 100-1000µ. Moreover, dust mites are virtually transparent and can be difficult to see without sophisticated microscopy. Dust mite feces and exoskeletal particles are even smaller, and can be 10 to 20 microns.

It is now generally accepted that dust mites, dust mite feces and other microscopic allergens are a significant cause of many asthmatic and allergic reactions in the home. Such micro-particles may be inhaled by a human coming into contact with infested pillows or bedding. To reduce exposure to dust mite allergens, various suggestions have been made for covering bedding in covers which act as a barrier to the passage of allergens. In this respect, it is known to cover allergen-bearing articles such as mattresses and cushions with a cover which serves as a dust-mite barrier. Such coverings define plastic materials or finely woven materials having openings of a size sufficiently small to inhibit the passage of dust mites there through. For instance, U.S. Pat. No. 5,050,256 discloses an allergen-barrier bedding cover made from a coated fabric. The fabric is said to have a pore size of less than 10 microns to prevent the passage of dust mites. The fabric is sewn to form the cover and the seams are sealed with an additional coating of polyurethane.

U.S. Pat. No. 5,321,861 discloses a protective cover for upholstered or padded articles. The cover is made from a microporous ultrafilter material having pores of less than 0.5 microns. To eliminate possible leakage of allergens through the seams or zipper closure, the cover is constructed using high frequency welding, and the zipper is covered by an adhesive tape.

U.S. Pat. No. 6,017,601 entitled Allergen-Barrier Cover presents a cover fabricated from a multi-layered fabric material. The material defines meltblown and spunbonded layers made from polypropylene which permits the passage of air but is said to be impermeable to the passage of water and of dust mites.

It is noted that the solutions offered from the above patents primarily attempt to trap dust mites within an allergen-carrying article, but do not seek to eliminate them. Further, the solutions do not enhance the cushioning or comfort of the user on the allergen-carrying article as would be offered by a nonwoven-based article.

Conventional miticides (or acaricides) based upon organophosphate compounds have been used for the extermination of mites. Such compounds are typically diluted in an aqueous spray. However, such compounds, while effective in eradicating mite infestations outdoors such as in farms, are not feasible for indoor use. In this respect, such acaricides are toxic to humans, and the extermination of mites by spraying of miticide chemicals has the side-effect of polluting the inhabited environment while also posing a toxicity risk for humans, particularly children and infants, as well as cats. Further, organophosphate acaricides cannot be used on beddings and, therefore the mites are left undisturbed in their main living site.

It is proposed here to provide a nonwoven structure having a tacky characteristic as a trap or filtering medium for allergens. In addition, a method for trapping allergens using a tacky material around an allergen carrying article is provided. Also provided herein is a "tacky material" defining a substrate which receives a tacky adhesive for trapping micro-sized particles such as dust mites.

SUMMARY OF THE INVENTION

The benefits and advantages of the present invention are achieved by a woven or nonwoven material, which could also be characterized as a composite fibrous material or pad, with adhesive properties.

This invention first offers a tacky material comprising:
 (A) a woven or nonwoven substrate which contains
  (i) matrix fibers
  (ii) optionally, a binder, and
 (B) a tacky adhesive.

At least some portion of the matrix fibers is treated with the adhesive to trap micro-particles. In one aspect, the matrix fibers are treated with an acaracidal compound.

Within the scope of this invention is a process for the production of a tacky material comprising:
 (A) producing or providing a woven or nonwoven substrate which contains
  (i) matrix fibers and,
  (ii) optionally, a binder; and
 (B) adhering a tacky adhesive to the substrate.

In specific embodiments of the invention, steps (A) and step (B) are performed in a series of unitary steps in a continuous process. However, step (B) may be performed separately by different entities as part of a converting process. In other words, a tacky adhesive is adhered to a previously formed substrate in a converting process. In either event, the tacky adhesive may be adhered to the substrate by a manufacturer by spraying, rolling, printing or foaming. Alternatively, the tacky adhesive may be applied to the substrate by a consumer by spraying the adhesive from an aerosol can or a pump spray onto the substrate.

A process for immobilizing and containing pests including allergen producing pests is also provided. The process comprises placing on or adhering to a surface of a mattress or other cushion of a bed, a pillow, a furniture cushion for an office, a dwelling or a vehicle the tacky material describe above.

Also provided herein is a filter element for filtering a fluidized stream of materials. In one aspect, the filter element includes:

(A) a filter housing, and
(B) the tacky material of the present invention.

The filter element may be sized to fit a residential air conditioning unit. The filter housing may house a plurality of layers of the tacky material. The fluidized stream may be a gas or a liquid.

A method for containing allergens adjacent an allergen-bearing article is also provided herein. In one aspect, the method comprises the steps of: providing a tacky material, the tacky material comprising a woven or nonwoven substrate which contains matrix fibers and, optionally, a binder, and a tacky adhesive; placing the tacky material adjacent the allergen-bearing article; trapping allergens moving into or out of the allergen-bearing article within the tacky material; removing the tacky material from the allergen-bearing article; and disposing of the allergen-bearing article.

The allergens may be dust mites; the allergen-bearing article may be a mattress; and the step of placing the tacky material adjacent the allergen-bearing article may involve spreading the tacky material over at least an upper surface of the mattress.

BRIEF DESCRIPTION OF THE DRAWINGS

FIG. 1 depicts a top layer or strata 10; the tacky material 100, with an upper intermediate stratum 20, top surface 22, and bottom surface 24. FIG. 1 also shows a lower intermediate nonwoven material layer 30, with a top surface 32 and bottom surface 34. Also shown is a release liner 40 and a light-weight container 50. The light-weight container 50 has a water-tight interior 52, a removable sealing member 58 and an upper lip 56.

DETAILED DESCRIPTION

Figure 1:
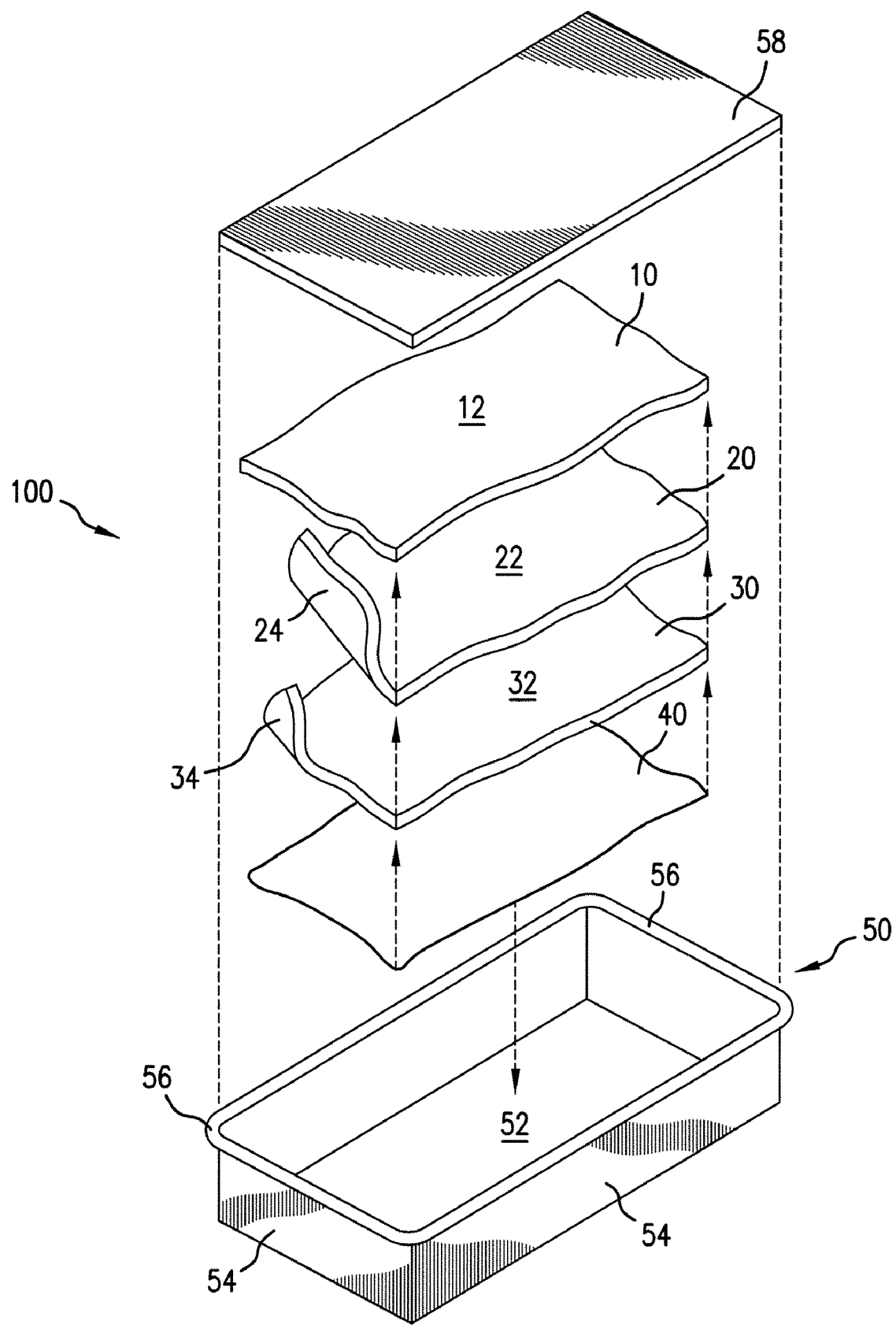
FIG. 1 presents a perspective view of a multistrata substrate tacky material 100.

The present invention advantageously provides for a nonwoven substrate, which provides allergen-retaining layers capable of trapping various allergens. The invention provides for a tacky material comprising the substrate with a tacky adhesive for use in a variety of filter type applications. In certain embodiments, the substrate may optionally contain a pest control substance. These and other aspects of the invention are discussed more in the detailed description and examples.

The terms used in this specification generally have their ordinary meanings in the art, within the context of this invention and in the specific context where each term is used. Certain terms are defined below to provide additional guidance in describing the compositions and methods of the invention and how to make and use them.

DEFINITIONS

As used herein, the term "matrix fiber" refers to any natural or synthetic fiber, or mixtures thereof. Natural fibers may include cellulose-based fibers such as those derived from wood pulp or cotton linter pulp.

The term "substrate" may refer to a single layer of material or multiple layers of material bonded together.

The term "tacky adhesive" refers to an adhesive that is either inherently tacky, or has been tackified by mixture with or application of a tackifier.

"Allergen-carrying articles" means any material in which dust-mites may reside or populate. Non-limiting examples of such items include but are not limited to mattresses, pillows, bolsters, duvets, quilts, articles of clothing, including for example the insulating lining of jackets, sleeping bags, furniture, furniture cushions, cushions used in boats and recreational vehicles and any other upholstered or padded item which may harbor dust mites and related allergens.

The term "tack" refers to a sticky or adhesive quality or condition. A "tacky material" is any substance that is capable of holding materials together in a functional manner by surface attachment that resists separation.

The term "pressure sensitive adhesive" means an adhesive material which bonds to adherend surfaces at room temperature immediately as low pressure is applied, or which requires only pressure application to effect permanent adhesion to an adherent.

The term "release layer" may be used interchangeably with the terms liner, release film, release liner and release sheet.

The term "weight percent" is meant to refer to the quantity by weight of a compound in the material as a percentage of the weight of the material or to the quantity by weight of a constituent in the material as a percentage of the weight of the final nonwoven product.

The term "basis weight" as used herein refers to the quantity by weight of a compound over a given area. Examples of the units of measure include grams per square meter as identified by the acronym (gsm).

As used in the specification and the appended claims, the singular forms "a," "an" and "the" include plural referents unless the context clearly dictates otherwise. Thus, for example, reference to "a compound" includes mixtures of compounds.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

Allergen Trap Substrate

An allergen trap is disclosed herein. The allergen trap is generally referred to herein as a "tacky material." The tacky material serves as a filtering medium for capturing allergens. Preferably, the tacky material serves to capture dust mites by providing a tacky characteristic to a layer or a "matrix" of fibers. The tacky material may define a structure for covering an allergen-bearing material such as a bed mattress, it may define a filtering medium in an air or other fluid filtering device, or may serve other micro-particle-trapping functions.

The tacky material first includes a substrate. The substrate may be fabricated or derived or made from woven or nonwoven fibers. In one specific embodiment, the substrate is made from nonwoven fibers. A wide variety of natural and synthetic fibers are suitable for use as matrix fibers for the substrate. Preferred matrix fibers are cellulosic fibers, though synthetic fibers or a mixture of cellulosic and synthetic fibers may be employed. In one aspect, the matrix fibers are any synthetic or cellulosic fiber that does not melt or dissolve to any degree during the formation or bonding of the nonwoven fibers.

Cellulosic fibrous materials suitable for use in the substrate of the present invention include both softwood fibers and hardwood fibers. See M. J. Kocurek & C. F. B. Stevens, *Pulp and Paper Manufacture—Vol. 1: Properties of Fibrous Raw Materials and Their Preparation for Pulping*, The Joint Textbook Committee of the Paper Industry, pp. 182 (1983), which is hereby incorporated by reference in its entirety. Exemplary, though not exclusive, types of softwood pulps are derived from slash pine, jack pine, radiata pine, loblolly pine, white spruce, lodgepole pine, redwood, and Douglas fir. North American southern softwoods and northern softwoods may be used, as well as softwoods from other regions of the world. Hardwood fibers may be obtained from oaks, genus *Quercus*, maples, genus *Acer*, poplars, genus *Populus*, or other commonly pulped species. In general, softwood fibers are preferred due to their longer fiber length as measured by T 233 cm-95, and southern softwood fibers are most preferred due to a higher coarseness as measured by T 234 cm-84, which leads to greater intrinsic fiber strength as measured by breaking load relative to either northern softwood or hardwood fibers.

One particularly suitable cellulose fiber is bleached Kraft southern pine fibers sold under the trademark FOLEY FLUFFS® (Buckeye Technologies Inc., Memphis, Tenn.). Also preferred is cotton linter pulp, chemically modified cellulose such as cross-linked cellulose fibers and highly purified cellulose fibers, such as Buckeye HPF, each available from Buckeye Technologies Inc., Memphis, Tenn. Other suitable cellulose fibers include those derived from Esparto grass, bagasse, jute, ramie, kenaff, sisal, abaca, hemp, flax and other lignaceous and cellulosic fiber sources.

The fibrous material may be prepared from its natural state by any pulping process including chemical, mechanical, thermomechanical (TMP) and chemithermomechanical pulping (CTMP). These industrial processes are described in detail in R. G. Macdonald & J. N. Franklin, *Pulp and Paper Manufacture in 3 volumes, $2^{nd}$ Edition, Volume 1: The Pulping of Wood*, 1969, *Volume 2: Control, Secondary Fiber, Structural Board, Coating*, 1969, *Volume 3: Papermaking and Paperboard Making*, 1970, The joint Textbook Committee of the Paper Industry, and in M. J. Kocurek & C. F. B. Stevens, *Pulp and Paper Manufacture, Vol. 1: Properties of Fibrous Raw Materials and Their Preparation for Pulping*, The Joint Textbook Committee of the Paper Industry, p. 182 (1983), both of which are hereby incorporated by reference in their entirety. Preferably, the fibrous material is prepared by a chemical pulping process, such as a Kraft or sulfite process. The Kraft process is especially preferred. Pulp prepared from a southern softwood by a Kraft process is often called SSK. In a similar manner, southern hardwood, northern softwood and northern hardwood pulps are designated SHK, NSK & NHK, respectively. Bleached pulp, which is fibers that have been delignified to very low levels of lignin, are preferred, although unbleached Kraft fibers may be preferred for some applications due to lower cost, especially if alkaline stability is not an issue. Thermomechanical cellulose fiber may be used. Desirably, the cellulose fiber for use as a matrix fiber has been derived from a source which is one or more of Southern Softwood Kraft, Northern Softwood Kraft, hardwood, eucalyptus, mechanical, recycle and rayon, but preferably Southern Softwood Kraft, Northern Softwood Kraft, or a mixture thereof, and more preferably, Southern Softwood Kraft.

The cellulose or fluff fibers may be blended with synthetic fibers such as polyester, nylon, polyethylene or polypropylene. Alternatively, only synthetic fibers may be employed in the substrate. Synthetic fibers suitable for use as a matrix fiber include cellulose acetate, polyolefins (including polyethylene and polypropylene), nylon, polyester (including polyethylene terephthalate (PET)), vinyl chloride, and regenerated cellulose such as viscose rayon, glass fibers, ceramic fibers, and the various bicomponent fibers known in the art. While bicomponent fibers may serve as matrix fibers in the nonwoven material of this invention, they will be more fully described and discussed below in the context of their role as a binder fiber.

Other synthetic fibers suitable for use in various embodiments as matrix fibers or as bicomponent binder fibers for the substrate include fibers made from various polymers including, by way of example and not by limitation, acrylic, polyamides (such as, for example, Nylon 6, Nylon 6/6, Nylon 12, polyaspartic acid, polyglutamic acid, and so forth), polyamines, polyimides, polyacrylics (such as, for example, polyacrylamide, polyacrylonitrile, esters of methacrylic acid and acrylic acid, and so forth), polycarbonates (such as, for example, polybisphenol A carbonate, polypropylene carbonate, and so forth), polydienes (such as, for example, polybutadiene, polyisoprene, polynorbornene, and so forth), polyepoxides, polyesters (such as, for example, polyethylene terephthalate, polybutylene terephthalate, polytrimethylene terephthalate, polycaprolactone, polyglycolide, polylactide, polyhydroxybutyrate, polyhydroxyvalerate, polyethylene adipate, polybutylene adipate, polypropylene succinate, and so forth), polyethers (such as, for example, polyethylene glycol (polyethylene oxide), polybutylene glycol, polypropylene oxide, polyoxymethylene (paraformaldehyde), polytetramethylene ether (polytetrahydrofuran), polyepichlorohydrin, and so forth), polyfluorocarbons, formaldehyde polymers (such as, for example, urea-formaldehyde, melamine-formaldehyde, phenol formaldehyde, and so forth), natural polymers (such as, for example, cellulosics, chitosans, lignins, waxes, and so forth), polyolefins (such as, for example, polyethylene, polypropylene, polybutylene, polybutene, polyoctene, and so forth), polyphenylenes (such as, for example, polyphenylene oxide, polyphenylene sulfide, polyphenylene ether sulfone, and so forth), silicon containing polymers (such as, for example, polydimethyl siloxane, polycarbomethyl silane, and so forth), polyurethanes, polyvinyls (such as, for example, polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, polyvinyl methyl ketone, and so forth), polyacetals, polyarylates, and copolymers (such as, for example, polyethylene-co-vinyl acetate, polyethylene-co-acrylic acid, polybutylene terephthalate-co-polyethylene terephthalate, polylauryllactam-block-polytetrahydrofuran, and so forth).

The matrix fibers desirably are present in the substrate in an amount of from about 30 percent by weight to about 95 percent by weight based on the total weight of the material, more desirably, from about 55 percent to about 90 percent by weight based on the total weight of the material, preferably in an amount of about 75 percent by weight to about 95 percent by weight.

As noted, the fiber matrix in the substrate may optionally include a binder. Binders suitable for use in the nonwoven material may be various bicomponent binder fibers or mixtures thereof, various latices or mixtures thereof, or bicomponent fibers or mixtures thereof in combination with various latices or mixtures thereof, which may be thermoplastic, thermosetting or a mixture thereof. Thermoplastic powders may be used in various embodiments, and may be included in the nonwoven as a fine powder, chip or in granular form. In addition, binders having dense fine powder filler such as, for example, calcium carbonate, various kinds of clay, such as, for example, bentonite and kaolin, silica, alumina, barium sulfate, talc, titanium dioxide, zeolites, cellulose-type powders, diatomaceous earth, barium carbonate, mica, carbon, calcium oxide, magnesium oxide, aluminum hydroxide, pulp powder, wood powder, polymer particles, chitin and chitin derivatives are suitable for use in forming the substrate.

Various latex binders are suitable for use in the nonwoven material of this invention, such as, for example, ethyl vinyl acetate copolymers such as AirFlex 124® offered by Air Products of Allentown, Pa. AirFlex 124® is used with 10 percent solids and 0.75 percent by weight AEROSOL® OT which is an anionic surfactant offered by Cytec Industries of West Paterson, N.J. Other classes of emulsion polymer binders such as styrene-butadiene and acrylic binders may also be used. BINDERS AIRFLEX® 124 and 192 from Air Products, Allentown, Pa., optionally having an opacifier and whitener, such as, for example, titanium dioxide, dispersed in the emulsion may be used. Other classes of emulsion polymer binders such as styrene-butadiene, acrylic, and carboxylated styrene butadiene acrylonitrile (SBAN) may also be used. A carboxylated SBAN is available as product 68957-80 from Dow Reichhold Specialty Latex LLC of Research Triangle Park, N.C. The Dow Chemical Company of Midland, Mich. is a source of a wide variety of suitable latex binders, such as, for example, Modified Styrene Butadiene (S/B) Latexes CP 615NA and CP 692NA, and Modified Styrene Acrylate (S/A) Latexes, such as, for example, CP6810NA. A wide variety of suitable latices are discussed in Emulsion Polymers, Mohamed S. El-Aasser (Editor), Carrington D. Smith (Editor), I. Meisel (Editor), S. Spiegel (Associate Editor), C. S. Kniep (Assistant Editor), ISBN: 3-527-30134-8, from the 217th American Chemical Society (ACS) Meeting in Anaheim, Calif. in March 1999, and in Emulsion Polymerization and Emulsion Polymers, Peter A. Lovell (Editor), Mohamed S. El-Aasser (Editor), ISBN: 0-471-96746-7, published by Jossey-Bass, Wiley. Also useful are various acrylic, styrene-acrylic and vinyl acrylic latices from Specialty Polymers, Inc., 869 Old Richburg Rd., Chester, S.C. 26706. Also useful are Rhoplex™ and Primal™ acrylate emulsion polymers from Rohm and Haas.

Bicomponent fibers having a core and sheath are known in the art. Many varieties are used in the manufacture of nonwoven materials, particularly those produced by airlaid techniques. Various bicomponent fibers suitable for use in the present invention are disclosed in U.S. Pat. Nos. 5,372,885 and 5,456,982, both of which are hereby incorporated by reference in their entirety. Examples of bicomponent fiber manufacturers include KoSa (Salisbury, N.C.), Trevira (Bobingen, Germany) and ES Fiber Visions (Athens, Ga.).

Bicomponent fibers may incorporate a variety of polymers as their core and sheath components. Bicomponent fibers that have a PE (polyethylene) or modified PE sheath typically have a PET (polyethyleneterephthalate) or PP (polypropylene) core. In one embodiment, the bicomponent fiber has a core made of polyester and sheath made of polyethylene. The denier of the fiber preferably ranges from about 1.0 dpf to about 4.0 dpf, and more preferably from about 1.5 dpf to about 2.5 dpf. The length of the fiber is preferably from about 3 mm to about 12 mm, more preferably from about 4.5 mm to about 7.5 mm.

Various geometric configurations can be used for the bicomponent fiber useful in this invention, including concentric, eccentric, islands-in-the-sea, and side-by-side. The relative weight percentages of the core and sheath components of the total fiber may be varied.

In one aspect of the invention, the substrate has a basis weight of from about 35 gsm to about 1,000 gsm or, alternatively, has a basis weight of from about 35 gsm to about 500 gsm or, alternatively still, has a basis weight of from about 35 gsm to about 250 gsm or, alternatively still, has a basis weight of from about 35 gsm to about 125 gsm, or alternatively still, has a basis weight of from about 35 gsm to about 75 gsm. In another aspect, the substrate has a basis weight of from about 100 gsm to about 1,000 gsm or, alternatively, has a basis weight of from about 250 gsm to about 1,000 gsm or, alternatively still, has a basis weight of from about 500 gsm to about 1,000 gsm. In yet another aspect, the substrate has a basis weigh of from about 100 gsm to about 1,000 gsm, or alternatively from about 1500 gsm to about 500 gsm, or alternatively from about 150 gsm to about 300 gsm, or alternatively still, from about 200 gsm to about 300 gsm, or from about 200 gsm to about 220 gsm.

In another aspect, the substrate has a basis weight of from about 35 gsm to about 500 gsm and contains from about 30 weight percent to about 95 weight percent matrix fibers and from about 5 weight percent to about 70 weight percent of a binder where the weight percentages are based on the total weight of the nonwoven substrate. Optionally, the substrate may contain from about 50 weight percent to about 95 weight percent matrix fibers and from about 5 weight percent to about 50 weight percent of a binder. Alternatively, the substrate may contain from about 75 weight percent to about 95 weight percent matrix fibers and from about 5 weight percent to about 25 weight percent of a binder.

In one embodiment of the invention, the substrate has a density of from about 0.035 g/cm$^3$ to about 0.10 g/cm$^3$.

In addition to being useful as a binder in the nonwoven material defining the substrate, a latice may be used on an outer surface of the material to control dusting. In this application, the amount used would be in the range of about 1 to about 10 gsm on an individual surface.

The materials of the present invention may also include additives including but not limited to ultra white additives, colorants, opacity enhancers, delustrants and brighteners, and other additives to increase optical aesthetics as disclosed in U.S. patent application Ser. No. 10/707,598 filed Dec. 23, 2003, which is hereby incorporated by reference in its entirety.

In a preferred process suitable for commercial production, the nonwoven material that serves as the matrix for the substrate is prepared as a continuous airlaid web. The airlaid web is typically prepared by disintegrating or defiberizing a cellulose pulp sheet or sheets, typically by hammermill, to provide individualized fibers. Rather than a pulp sheet of virgin fiber, the hammermills or other disintegrators can be fed with recycled airlaid edge trimmings and off-specification transitional material produced during grade changes and other airlaid production waste. Being able to thereby recycle production waste would contribute to improved economics for the overall process. The individualized fibers from whichever source, virgin or recycle, are then air conveyed to forming heads on the airlaid web-forming machine. A number of manufacturers make airlaid web forming machines suitable for use in this invention, including Dan-Web Forming of Aarhus, Denmark, M&J Fibretech A/S of Horsens, Denmark, Rando Machine Corporation, Macedon, N.Y. which is described in U.S. Pat. No. 3,972,092, Margasa Textile Machinery of Cerdanyola del Vallès, Spain, and DOA International of Wels, Austria. While these many forming machines differ in how the fiber is opened and air-conveyed to the forming wire, they all are capable of producing the webs of this invention.

The Dan-Web forming heads include rotating or agitated perforated drums, which serve to maintain fiber separation until the fibers are pulled by vacuum onto a foraminous forming conveyor or forming wire. In the M&J machine, the forming head is basically a rotary agitator above a screen. The rotary agitator may comprise a series or cluster of rotating propellers or fan blades. Other fibers, such as a synthetic thermoplastic fiber, are opened, weighed, and mixed in a fiber dosing system such as a textile feeder supplied by Laroche S. A. of Cours-La Ville, France. From the textile feeder, the fibers are air conveyed to the forming heads of the airlaid machine where they are further mixed with the comminuted cellulose pulp fibers from the hammer mills and deposited on the continuously moving forming wire. Where defined layers are desired, separate forming heads may be used for each type of fiber.

The airlaid web is transferred from the forming wire to a calender or other densification stage to densify the web, if necessary, to increase its strength and control web thickness. The fibers of the web are then bonded by passage through an oven set to a temperature high enough to fuse the included thermoplastic or other binder materials. Secondary binding from the drying or curing of a latex spray or foam application may occur in the same oven. The oven may preferably be a conventional through-air oven or be operated as a convection oven, but may achieve the necessary heating by infrared or even microwave irradiation. The airlaid web may be treated with flame retardants before or after heat curing.

In a preferred embodiment of the inventions, the nonwoven structure making up the substrate is an airlaid structure, and the nonwoven material is an airfelt or other nonbonded matrix of fiber or, when bonded, an airlaid matrix.

The caliper, also know as the thickness, for the substrate may range from about 1 mm to about 60 mm, while in some desirable embodiments it may be from about 1 mm to about 30 mm, or from about 1 mm to about 15 mm, or from about 1 mm to about 7 mm, or from about 1 mm to about 3 mm.

The nonwoven structure has an airflow resistance of from about 500 to about 10,000 Rayls (NS/m$^3$), or desirably in some embodiments, of from about 500 to about 5,000 Rayls (NS/m$^3$), or desirably in some embodiments, of from about 500 to about 3,000 Rayls (NS/m$^3$). By means of the selection of materials used to make the nonwoven structure, it is possible to produce materials with a variety of airflow resistances. Airflow resistance will also depend upon the application and number of layers employed. Air filtration applications may require a lower airflow resistance.

Various materials, structures and manufacturing processes useful in the practice of this invention are disclosed in U.S. Pat. Nos. 6,241,713; 6,353,148; 6,353,148; 6,171,441; 6,159,335; 5,695,486; 6,344,109; 5,068,079; 5,269,049; 5,693,162; 5,922,163; 6,007,653; 6,355,079; 6,403,857; 6,479,415; 6,562,742; 6,562,743; 6,559,081; 6,495,734; 6,420,626; in U.S. patent applications with serial numbers and filing dates, Ser. No. 09/719,338 filed Jan. 17, 2001; Ser. No. 09/774,248 filed Jan. 30, 2001; and Ser. No. 09/854,179 filed May 11, 2001, and in U.S. Patent Application Publications or PCT Application Publications US 2002/0074097 A1, US 2002/0066517 A1, US 2002/0090511 A1, US 2003/0208175 A1, US 2004/0116882 A1, US 2004/0020114 A1, US 2004/0121135 A1, US 2005/0004541 A1, and WO 2005/013873 A1, and PCT/US04/43030 claiming the benefit of U.S. provisional patent application Ser. No. 60/569,980, filed May 10, 2004 and U.S. provisional patent application Ser. No. 60/531,706, filed Dec. 19, 2003, and U.S. provisional patent application Ser. No. 60/667,873, filed Apr. 1, 2005, all of which are hereby incorporated by reference in their entirety.

Tacky Adhesive

As noted, the substrate of the allergen trap is coated with or will otherwise receive a tacky material. Preferably, the tacky material is a tackified pressure sensitive adhesive. The term "pressure sensitive adhesive" generally refers to an adhesive which in dry form is aggressively and permanently tacky at room temperature and firmly adheres to a variety of dissimilar surfaces upon contact without a need of more than finger or hand pressure. See *Glossary of Terms Used in Pressure Sensitive Tape Industry*, Pressure Sensitive Tape Council (PSTC), Glenview, Ill., 1959, as quoted on page 345 in *Encyclopedia of Polymer Science and Engineering*, Vol. 13, 1988, John Wiley & Sons, Inc. See also *Pressure-Sensitive Formulation*, by Istvan Benedek, ISBN 9 067 64330 0, Publisher VSP, 2000.

Pressure sensitive adhesives typically include materials (e.g., elastomers) that are either inherently tacky or that are tackified with the addition of tackifying resins. They can be defined by the Dahlquist criteria described in *Handbook of Pressure Sensitive Adhesive Technology*, D. Satas, 2nd ed., page 172 (1989) at use temperatures. Use temperature will typically be room temperature, i.e., about 20° C. to about 30° C. This criterion defines a good pressure-sensitive adhesive as one having a one-second creep compliance of greater than $1\times10^{-6}$ cm$^2$/dyne. Alternatively, since modulus is, to a first approximation, the inverse of compliance, pressure sensitive adhesives may be defined as adhesives having a modulus of less than $1\times10^6$ dynes/cm$^2$.

Another suitable definition of a pressure sensitive adhesive is that it preferably has a room temperature storage modulus within the area defined by the following points as plotted on a graph of modulus versus frequency at 25° C.: a range of moduli from approximately $2\times10^5$ to $4\times10^5$ dynes/cm$^2$ at a frequency of approximately 0.1 radian/second (0.017 Hz), and a range of moduli from approximately $2\times10^6$ to $8\times10^6$ dynes/cm$^2$ at a frequency of approximately 100 radians/second (17 Hz) (for example, see FIG. 8-16 on p. 173 of *Handbook of Pressure Sensitive Adhesive Technolga*, D. Satas, 2nd ed., (1989)).

Other methods of identifying a pressure sensitive adhesive are also known. Any of these methods of identifying a pressure sensitive adhesive may be used to define pressure sensitive adhesives of the present invention. Major classes of pressure sensitive adhesives include acrylics, polyurethanes, poly-alpha-olefins, silicones, and tackified natural and synthetic rubbers. Some examples of synthetic rubbers include tackified linear, radial (e.g., star), tapered, and branched styrenic block copolymers, such as styrene-butadiene-styrene, styrene-ethylene/butylene-styrene, and styrene-isoprene-styrene.

The pressure-sensitive adhesive material can include a single, pressure-sensitive adhesive, a mixture of several pressure-sensitive adhesives, or a mixture of a pressure-sensitive adhesive and a material that is a non-pressure-sensitive adhesive. An example of a non-pressure-sensitive adhesive is a nontacky thermoplastic material. Examples of some pressure-sensitive adhesive blends are described in PCT International Applications having numbers WO 97/23577, WO 97/23249, and WO 96/25469, such descriptions being incorporated herein by reference in their entirety.

A variety of pressure-sensitive adhesives are available for application to the fibrous material employed herein. The pressure sensitive adhesive is present in an amount from about 5 gsm to about 300 gsm. The pressure-sensitive adhesive may be a rubber substance such as natural rubber latex, butadiene rubber latex or styrene-butadiene rubber latex. The pressure-sensitive adhesive may alternatively be an acrylate or methacrylate copolymer, a self-tacky poly-α-olefin, a polyurethane, or a self-tacky or tackified silicone.

It is desirable to use a water-based pressure-sensitive adhesive. This avoids the difficulties encountered with solvent-based adhesives, including flammability and environmental issues. It is perceived that a water-based adhesive will also avoid issues of human toxicity, as one application for the tacky material of the present invention is in use as a mattress cover. In other words, the adhesive is applied to a fibrous material that will, in certain contexts and applications, be in close proximity to a consumer's respiratory system. Another application will be as a layer or medium in an air filtration system which is designed to improve air quality, meaning that non-toxic materials are preferred.

At least a portion of the fiber matrix is impregnated with the pressure-sensitive adhesive. Preferably, the adhesive is a rubber substance that is either a natural rubber latex or a synthetic rubber latex. Examples of a synthetic rubber latex include butadiene rubber latex and styrene-butadiene rubber latex. It is preferred that the synthetic rubber material be inherently tacky, or self-tacky. More specific examples of inherently tacky synthetic rubber pressure-sensitive adhesives include butyl rubber, a copolymer of isobutylene with less than 3 percent isoprene, polyisobutylene, a homopolymer of isoprene, polybutadiene, or styrenel-butadiene rubber.

The rubber material is preferably provided in the form of an aqueous latex emulsion which can be sprayed onto the fibrous material. Spraying provides the best opportunity for the emulsion to penetrate fibers material beneath the immediate surface being sprayed. The latex emulsion is preferably applied to the substrate while the substrate is in a substantially dry condition. However, the emulsion may alternatively be applied to the substrate in a pre-wetted condition. This permits the latex emulsion to further impregnate the hydroentangled material.

In some applications it is desirable that the adhesive material be applied only on the outer surface of the substrate. In this case, it is preferred that the latex emulsion be printed, foamed, or rolled onto the fibrous material. Alternatively, a light spray may be applied, followed immediately by drying in an oven.

In order to improve the particle-entrapping characteristic of the substrate, it is desirable that the adhesive be "tackified." A "tackifier" is a substance that will increase the coefficient of friction of the material being treated, thereby increasing the ability of the pressure-sensitive adhesive to attract and retain dust and allergen particles. Generally, when additives (such as a tackifier) are used to alter properties of pressure sensitive adhesives, the additives should be miscible with the pressure sensitive adhesive or form homogeneous blends at the molecular level.

General examples of suitable tackifiers include, but are not limited to, acetate, acrylic polymer, polystyrene and butadiene-styrene. Some types of pressure sensitive adhesives have been modified with tackified thermoplastic elastomers (e.g., styrene-isoprene-styrene block copolymers), thermoplastics (e.g., polystyrene, polyethylene, or polypropylene), and elastomers (e.g., polyolefins, natural rubbers, and synthetic rubbers). For example, thermoplastic materials have been added to acrylic pressure sensitive adhesives to add tack. Such materials are described in International Publication Nos. WO 97/23577 and WO 96/25469 (each to Minnesota Mining and Manufacturing Co.).

As used herein, a thermoplastic elastomer (i.e., thermoplastic rubber) is a polymer having at least two homopolymeric blocks or segments, wherein at least one block has a Tg of greater than room temperature (i.e., about 20° C. to about 25° C.) and at least one block has a Tg of less than room temperature. As used herein, "Tg" is a measurement known in the art as the glass transition temperature at which an amorphouse polymer or regions thereof change from hard condition to a viscous or rubber-like conditions. In a thermoplastic elastomer these two blocks are generally phase separated into one thermoplastic glassy phase and one rubbery elastomeric phase. A radial block copolymer is a polymer having more than two arms that radiate from a central core (which can result from the use of a multifunctional coupling agent, for example), wherein each arm has two or more different homopolymeric blocks or segments as discussed above. See, for example, the *Handbook of Pressure Sensitive Adhesive Technology*, D. Satas, 2nd ed., Chapter 13 (1989).

Natural rubber pressure-sensitive adhesives generally contain masticated natural rubber, tackified with one or more tackifying resins. They may also contain one or more antioxidants.

Synthetic rubber pressure sensitive adhesives are also contemplated by the present invention. Styrene block copolymer pressure-sensitive adhesives generally comprise elastomers of the A-B or A-B-A type, wherein, in this context, A represents a thermoplastic polystyrene block and B represents a rubbery block of polyisoprene, polybutadiene, or poly(ethylene/butylene), and tackifying resins. Examples of the various block copolymers useful in block copolymer pressure-sensitive adhesives include linear, radial, star, and tapered block copolymers. Specific examples include copolymers such as those available under the trade designations KRATON™ from Shell Chemical Company of Houston, Tex., and EUROPRENE SOL™ from EniChem Elastomers Americas, Inc., also of Houston, Tex. Examples of tackifying resins for use with such styrene block copolymers include aliphatic olefin-derived resins, rosin esters, hydrogenated hydrocarbons, polyterpenes, terpene phenolic resins derived from petroleum or terpentine sources, polyaromatics, cournarone-indene resins, and other resins derived from coal tar or petroleum and having softening points above about 85° C.

Pressure sensitive adhesives may also be acrylic pressure sensitive adhesives. Acrylic pressure-sensitive adhesives comprise about 80 wt % to about 100 wt % isooctyl acrylate and up to about 20 wt % acrylic acid. The acrylic pressure-sensitive adhesives may be inherently tacky or tackified using a tackifier such as a rosin ester, an aliphatic resin, or a terpene resin. (Meth)acrylate (i.e., acrylate and methacrylate or "acrylic") pressure-sensitive adhesives generally have a glass transition temperature of about −20° C. or less and typically include an alkyl ester component such as, for example, isooctyl acrylate, 2-ethyl-hexyl acrylate, and n-butyl acrylate, and a polar component such as, for example, acrylic acid, methacrylic acid, ethylene vinyl acetate, and N-vinyl pyrrolidone.

An example of an acrylic pressure-sensitive adhesive that may be used on a nonwoven substrate is 3M Fastbond™ Insulation Adhesive 49. 3M Fastbond™ is an aqueous dispersion of an acrylate polymer. Another example is an ethylene-vinyl acetate copolymer available as DUR-O-SET® manufactured by Vinamul®. DUR-O-SET® is sold as a spray-on adhesive emulsion. Yet another example is FLEXCRYL® 1625, which is a high-solids, water-based vinyl acrylate pressure sensitive adhesive. It is sold as an acrylic emulsion and manufactured by Air Products and Chemicals, Inc., Allentown, Pa. Still another example is NACOR® 38-088A, which is an aqueous emulsion of an acrylic copolymer available from National Starch and Chemical Co. of Bridgewater, N.J.

The pressure sensitive adhesives of the present invention may include poly-α-olefin pressure-sensitive adhesives. Poly-α-olefin pressure-sensitive adhesives, also called poly (1-alkene) pressure-sensitive adhesives, generally comprise either a substantially uncrosslinked polymer or an uncrosslinked polymer that may have radiation activatable functional groups grafted thereon as described in U.S. Pat. No. 5,209,971 (Babu et al.) (the disclosure of which is incorporated herein by reference in its entirety). Useful poly-α-olefin polymers include, for example, $C_3$-$C_{18}$ poly(1-alkene) polymers. The poly-α-olefin polymer may be inherently tacky and/or include one or more tackifying materials such as resins derived by polymerization of $C_5$-$C_9$ unsaturated hydrocarbon monomers, polyterpenes, synthetic polyterpenes, and the like.

Silicone pressure-sensitive adhesives may also be used on the present invention. Silicone pressure-sensitive adhesives comprise two major components, a polymer or gum and a tackifying resin. The polymer is typically a high molecular weight polydimethylsiloxane or polydimethyldiphenylsiloxane, that contains residual silanol functionality (SiOH) on the ends of the polymer chain, or a block copolymer comprising polydiorganosiloxane soft segments and urea terminated hard segments. The tackifying resin is generally a three-dimensional silicate structure that is endcapped with trimethylsiloxy groups ($OSiMe_3$) and also contains some residual silanol functionality. Silicone pressure-sensitive adhesives are described in U.S. Pat. No. 2,736,721, which is incorporated herein by reference. Silicone urea block copolymer pressure-sensitive adhesives are described in U.S. Pat. No. 5,461,134, and PCT International Application Nos. WO 96/34028 and WO 96/35458, also incorporated herein by reference.

The tackifier is preferably applied in an aqueous vehicle, that is, an emulsion, along with the adhesive. Thereafter, the fibrous material is dried, preferably in an oven, to cause the carrier to retain the rubber or other adhesive material.

While a wide variety of adhesives are suitable for use in this invention on a wide variety of substrates, it is desirable that the material with tack exhibit adequate performance in a Dust Capture Performance Test. Example 4 below provides a detailed description of the execution of this test. In this test, it is desirable that a material with tack having a basis weight of from about 35 gsm to about 125 gsm when tested with a 0.5 g sample of Arizona Test Dust ("ATD") have a Dust Capture of about 60% or greater, more desirably, the Dust Capture is about 70% or greater, still more desirably, the Dust Capture is about 80% or greater, preferably, the Dust Capture is about 90% or greater. In one instance, dust mite allergens and feline allergens are reduced by about 95% or more in an Allergen Barrier Test.

In a specific embodiment, the tacky adhesive is applied to the substrate at the time of manufacture. The product is then shipped to the customer or user as a final product. However, in one aspect the user will open the packaging and then apply the tacky adhesive after the substrate has been placed adjacent to an allergen-bearing article. Application of the adhesive may be by a pump spray or an aerosol can. The applicator may be included in the packaging with the substrate, or may be sold separately by the manufacturer or other source as an "after-market" product.

Pest Control Substances

In addition to a tacky adhesive, the substrate may also be treated with a miticidal compound or substance. The miticide (or acaricide or other pesticide) is preferably applied to the substrate after the fiber matrix has received a tacky adhesive. Alternatively, the miticide may be dissolved or suspended within the binder for the nonwoven material. The miticidal compound or substance will be a material that is nontoxic to humans and pets. Acceptable miticides include pyrethroid compounds such as viz permethrin, cypermethrin and deltamethrin, both of which are available. Such pyrethroids may be mixed in a 10% by weight emulsifiable concentrate formulation and sprayed onto the substrate. Particular examples of permethrin that may be used are Permanone™ WP available from AgrEvo of Montvale, N.J. and Smite™ from Medachieve, Inc. in Washington Courthouse, Ohio. Pyrethrin also comes in a natural or "botanical" form. Pyrethrin is an extract of the crushed dried flowers of *Chrysanthemum cinerarifolium*, a perennial daisy like plant from Kenya.

Alternatively, borate-type compounds such as those disclosed in U.S. Pat. Nos. 5,587,221 and 5,672,362 may be used, the disclosures of which are incorporated herein by reference in their entireties. One borate-based product that may be used in the invention herein is supplied as Dustmitex™, which is available from The Ecology Works of San Rafael, Calif. Dustmitex™ is a formulated borate compound sold in powder form. Rotenone, also known as Cube root, is known to be an effective botanical in controlling a number of insects, including mites. Rotenone comes from the Derris family of plants grown in the tropics throughout the world. Rotenone acts as an insect stomach poison.

As an alternative to an acaricidal substance, an allergen neutralizer may be applied to the substrate of the tacky material. One option of a neutralizer is a tannic acid material. Such a material is found naturally in strong teas such as black tea. Tannic acid is considered a "denaturant." Tannic acid is capable of breaking down mite fecal allergens. Allergen denaturation is accomplished by the phenol groups of tannic acid, which polymerize the allergens, making them more hydrophobic and less allergenic. However, a disadvantage to the use of tannic acid is that it stains fabric.

Tannic acid powders are available on the market, such as ALLERSEARCH X MITE™ powder (available from Alkaline Corporation of Oakhurst, N.J.) which provides a benzyl tannate complex in a cellulose aqueous slurry. The product may be sprinkled on carpets or other areas where mite allergens are found. This product is available on-line through www.healthgoods.com or www.allersearch-us.com. In the present invention, such a dust mite allergen neutralizer may be sprinkled lightly onto the substrate where it is then held by the tacky adhesive.

As another alternative to a pesticide, an insect growth regulator (IGR) may be applied to the matrix fibers. This may be done either by attaching the insect growth regulator to the sticky adhesive, or by dissolving or suspending the growth regulator within the binder. Growth inhibitors or insect growth regulators (any of which is commonly known as an IGR) are products or materials that interrupt or inhibit the life cycle of a pest. IGR's operate under the principle that if the pest cannot reach adulthood, it is not capable of reproducing. By inhibiting the maturity of an insect, the IGR keeps the insect from reaching the critical adult stage, thus stopping the life cycle and infestation.

Various IGR compounds have been developed. Methoprene and hydroprene are both considered to have beneficial effect on dust mite populations. Methoprene and hydroprene are synthetic compounds that mimics the insect's juvenile hormone. They are also considered to have low human toxicity.

Use of Multiple Layers

The nonwoven substrate may define more than one layer of material. In this respect, the tacky material may optionally include a second, a third, or even a fourth layer of nonwoven material.

In one embodiment, a thin second layer of nonwoven material is applied along one surface of a first nonwoven stratum. This thin second layer is referred to herein as a "scrim." The optional scrim preferably has a basis weight of from about 8 gsm to about 200 gsm. As a result of the manufacturing process, the scrim is integral with a surface of the nonwoven material that makes up the first layer. In one aspect, the scrim is used as a carrier sheet in an airlaid process, with the interior surface of the scrim in direct contact with the interior surface of the nonwoven first layer. In a preferred method of production using airlaying techniques, the nonwoven first layer is formed directly on the interior surface of the scrim. However, the process may combine the scrim with a pre-formed airlaid or other nonwoven material in a converting process.

The nonwoven scrim, or carrier, can be made from natural fibers such as cellulose fibers. Synthetic fibers of various sorts which are spun-bonded, meltblown or spunlaced may also be used. A wide variety of materials including, a wetlaid or airlaid nonwoven material, cloth, textile, unbacked carpeting and other woven materials made of various natural fibers, synthetic fibers and mixtures thereof may further be used as carriers. Examples are 3024 cellulosic carrier tissue, 18 gsm, from Cellu Tissue Co., now Cellu Tissue Neenah, 249 N. Lake Street, Neenah, Wis. 54956, needle-punched nonwoven fabrics, spunbonded polypropylene nonwovens, such as Hybond™, a spunlaid thermalbonded soft fabric available in basis weights from 14 gsm to 20 gsm and ULTRATEX™, a spunlaid (continuous filament) thermalbonded polypropylene nonwoven in basis weights of 20, 40, 50, 60, 70, 100, 120, and 150 gsm, from Texbond S.P.A., Via Fornaci 15/17, 38068 Rovereto (TN), Italy. Polyester spunbond nonwovens, with a uniform surface, high tear strength and high porosity, can be used. Polyester spunbond, which is a manufactured sheet of randomly orientated polyester filaments bonded by calendaring, needling, chemically or a combination of these methods in basis weights from 15 to 500 $g/m^2$ is available from Johns Manville Sales GmbH, Max-Fischer-Strasse 11, 86399 Bobingen/Germany. In general the scrim may be formed via the spunbond process, the melt-blown process, the spunlaced process, the carding process or a combination of any of these processes, such as, for example, spunbond-meltblown-spunbond or spunbond-meltblown-meltblown-spunbond. Of interest also are other useful materials such as those where the scrim is made of a polyester, such as, for example, polyethylene terephthalate, polytrimethylene terephthalate and so forth, a polyolefin, such as, for example, polyethylene, polypropylene and so forth, polylactic acid, nylon or a combination of these materials.

While the scrim can have a basis weight of from about 8 gsm to about 200 gsm, it may be desirable for the scrim to have a basis weight of from about 8 gsm to about 100 gsm, more desirable, from about 8 gsm to about 75 gsm, or it may be preferable that the scrim has a basis weight of from about 8 gsm to about 50 gsm, or even from about 8 gsm to about 25 gsm.

In another embodiment of the tacky material of the present invention, a layer or stratum of nonwoven material impregnated with a tacky adhesive is provided to form a tacky layer. The tacky layer is then placed between nonwoven material layers that do not have a tacky adhesive applied thereon. In this way, an allergen-carrying article (such as a mattress) which receives the tacky material is not in immediate contact with the tacky adhesive. Likewise, a user which sits or rests on the tacky material is not in immediate contact with the tacky adhesive. The result is that a tackier adhesive may be employed for the intermediate layer. Further, tacky material units may be packaged one on top of the other without use of a release liner.

The adhesive of the tacky layer may be coextensively contiguous with a major interior or exterior surface of the substrate. Alternatively, the adhesive may be coextensively contiguous with only one or more selected areas of the substrate. The adhesive may be applied to a layer of matrix fibers after the layer is formed such that the steps are performed in a series of unitary steps in a continuous process. Alternatively, the tacky adhesive may be adhered to a previously formed substrate in a converting process.

In still another embodiment of the tacky material, a miticidal compound is applied to a tacky layer between two non-tacky layers of nonwoven material. The tacky layer having the miticidal compound may be placed adjacent a second tacky layer which does not have a miticidal compound. The two tacky layers are then sandwiched between two nonwoven layers that do not have a tacky adhesive. In this way, a user which sits or rests on the tacky material is not in immediate contact with the tacky adhesive.

In yet another embodiment of the tacky material, an activated charcoal material is applied to a tacky layer between two non-tacky layers of nonwoven material. The tacky layer having the activated charcoal material may be placed adjacent a second tacky layer which has a miticidal compound.

In another embodiment of the tacky material of the present invention, an outer nonwoven layer or strata of the substrate is sprayed with a tacky adhesive on an exterior surface. A release layer is then applied or adhered to the tacky adhesive. The release layer is non-tacky, and permits multiple tacky material units to be stacked one on top of the other prior to or within packaging. The release liner is preferably left in place after the tacky material is packaged and shipped to the ultimate user. The release liner is peeled from the substrate prior to or shortly after placement of the tacky material onto an allergen-carrying article.

The material used for the liner is preferably matched to the type of adhesive used on the substrate. Release liners include, for example, paper, metal foils, and polymeric films, that is, polyolefin, polyethylene, polyester, and plasticized vinyl films. Polyethylene and polypropylene films are advantageous because they do not require a separate coating (e.g. silicones) to provide a release surface. Silicone-coated polyester release liners are also known in the art. Release liners may also include woven or nonwoven fabrics which have been treated on at least one major surface, and preferably on both major surfaces, with a release agent such as silicone, perfluoropolyether, TEFLON™, and the like.

Method for Containing Allergens

A method for containing allergens is also disclosed herein. In one embodiment, the method includes a step of providing a tacky material, such as tacky material 100 in FIG. 1. It is understood, however, that the tacky material may be any embodiment understood from the disclosures above. In this respect, the tacky material will include a substrate that contains matrix fibers that may be either woven or nonwoven, and which may be either natural, synthetic, or a combination. Further, the tacky material will include a tacky adhesive that is either impregnated within one or more stratum of the substrate, or which is applied to a surface of the substrate or one of its stratum. At least a portion of the matrix fibers may be treated with a nontoxic miticidal compound.

The tacky material is placed over and, optionally, around an allergen-bearing article. Examples of such an article include a mattress, a pillow or a furniture cushion. Over a period of time, allergens such as dust mites are trapped by the adhesive within the tacky material. After an additional period of time, the tacky material is removed from the allergen-bearing article and disposed of. A new tacky material is then provided.

Use of Tacky Material for Filtering

The tacky material may also be used as a filtering media. In this respect, the tacky material may be sized to be placed within a filter housing. The tacky material may be the only medium used in the filter housing, or may be used in combination with a charcoal filter, a HEPA filter or other filtering media. Consistent with this arrangement, a process for immobilizing and containing allergens is provided.

In one embodiment of the invention, the substrate is used as it produced, but cut to an appropriate size and attached over an air filter. This simple use provides an inexpensive means for a high quality filter cartridge.

In addition, a filter element for filtering a fluidized stream of materials is provided. The filter element includes a filter housing, and any embodiment of the tacky material disclosed above. In one aspect, the filter element is the housing for an air mover in a house, or is otherwise sized to fit a residential air conditioning unit within the air stream. The filter housing may house a substrate defining a plurality of layers, including more than one layer having a tacky adhesive.

A process for filtration of a fluidized stream of materials is also provided. The process includes the step of providing a tacky material in any embodiment disclosed above. The tacky material is incorporated into a filtering element as a filtering medium. The fluidized stream of materials is then passed through the tacky material in order to filter suspended particulate matter or dissolved matter. The fluidized stream may, in one aspect, be air or another gas. The suspended particulate matter may contain dust, allergens, or a mixture thereof. In another aspect, the fluidizing stream is a liquid.

EXAMPLES

The following examples are merely illustrative of the present invention and they should not be considered as limiting the scope of the invention in any way.

Example 1

Basic Airlaid Structures

Nonwoven substrates were produced having dimensions of 0.3556 meters by 0.3556 meters (14 inches by 14 inches). The substrates were produced using a laboratory padformer that deposits individualized fibers on a forming wire under vacuum. Airfelts having basis weights of 40 gsm (grams per square meter), 45 gsm, 50 gsm, 80 gsm, and 100 gsm, respectively, were prepared on the padformer. The raw materials used were southern softwood Kraft fluff pulp, available as FOLEY FLUFFS® from Buckeye Technologies Inc., Memphis, Tenn., and bicomponent binder fiber with a polyethylene sheath over a polyester core, available as Type T-255 with merge number 1661, which had a 2.2 dtex denier and 6-mm length, made by Trevira GmbH of Bobingen, Germany.

Table 1 shows the amount of pulp and bicomponent fiber used in the experimental substrates.

TABLE 1

Composition of Laboratory Padformed Samples

| Raw Material | Sample A Basis Wt. (gsm) | Sample B Basis Wt. (gsm) | Sample C Basis Wt. (gsm) | Sample D Basis Wt. (gsm) | Sample E Basis Wt. (gsm) |
|---|---|---|---|---|---|
| Pulp - FOLEY FLUFFS ® Southern Softwood Kraft | 35.0 | 40.0 | 45.0 | 60.0 | 80.0 |
| Bicomponent (T-255, Merge No. 1661) | 5.0 | 5.0 | 5.0 | 20.0 | 20.0 |
| Total (gsm) | 40.0 | 45.0 | 50.0 | 80.0 | 100.0 |

Example 2

Airlaid Substrate

An airlaid substrate called NLT3 was prepared on a Dan-Web pilot scale airlaid manufacturing unit at Buckeye Technologies, Inc. in Memphis, Tenn. The raw materials were (1) a southern softwood Kraft fluff pulp, available as FOLEY FLUFFS® from Buckeye Technologies Inc.; (2) bicomponent binder fiber with a polyethylene sheath over a polyester core, available as Type T-255 with merge number 1663, made by Trevira GmbH of Bobingen, Fibervisions™; (3) AL-Adhesion polyolefin bicomponent fibers produced by Fibervisions; and (4) an ethylene vinyl acetate latex binder available as AIRFLEX® 192 manufactured by Air Products. (AIRFLEX® 192 usually has an opacifier and whitener, such as titanium dioxide, dispersed in the emulsion). Trevira's T-255 Merge No. 1663 bicomponent fiber has a denier of 2.2-dtex, and is 3-mm in length and a 50/50 ratio of polyester to polyethylene. Fibervision's™ AL-Adhesion bicomponent fibers consist of a polypropylene core and a polyethylene sheath. Fibervision™ AL-fibers are suitable for blends with wood pulp as they have an improved ability to bind cellulosic fibers and reduce dust to the minimum.

The airlaid structure substrate NTL3 had a basis weight of 69.9 gsm and was prepared according to the composition given in Table 2 on the pilot line.

TABLE 2

Composition of Pilot Example 1 (NLT3 Control)

| Component of Substrate | Basis Weight (gsm) |
|---|---|
| Southern Softwood Pulp - FOLEY FLUFFS ® | 32.3 |
| Bicomponent Fiber (PET/PE) - Trevira 1663 | 7.30 |
| Fibervisions ™ AL-Adhesion Fiber | 29.1 |
| EVA Latex Binder Spray - AIRFLEX ® 192 | 1.20 |
| Total Basis Weight | 69.9 |

The first forming head added 29.1 gsm of Fibervisions™ AL-Adhesion. The second forming head added a mixture of 32.3 gsm of FOLEY FLUFFS® pulp and 7.30 gsm of Trevira 1663 bicomponent fibers. Immediately after this, the web was compacted with a compaction roll. 1.20 gsm AIRFLEX® 192 latex emulsion was then sprayed onto the top of the web. The web was then cured in a Moldow Through Air Tunnel Dryer at a temperature of 135° C. After this, the web was wound in a roll. The machine speed was approximately 10-20 meters/minute.

Example 3

Padformed Samples of Allergen Barrier Material

Basic padformed structures A, B, and C, see Table 1, formed in Example 1 were each trimmed to 0.3556 meters by 0.3556 meters (14 inch by 14 inch) samples. One surface of each of substrates A and B was sprayed with a water-based adhesive available as 3M Fastbond™ Insulation Adhesive 49 produced by 3M, and the product was cured in a laboratory oven at 150° C. for 15-20 minutes.

3M Fastbond™ Insulation Adhesive 49 is an aqueous dispersion of an acrylate polymer, with a solids content of 53-57 percent and a pH of 4.1-4.5, and which is non-flammable in the wet state. Against a glass substrate the 180 peel strength is 2.8 N/10 mm and the overlap shear is 0.37 Mpa.

The basis weights of Samples A and B with the adhesive add-on were 50 gsm. Sample C formed in Example 1 to a 50.0 gsm basis weight served as the control for this experiment. The samples were sticky to the touch. Table 3 below shows the amount of adhesive add-on to each substrate.

TABLE 3

Composition of 50.0 gsm Padformed Samples

| Experimental Padformed Substrate | Substrate Basis Weight (gsm) | Add-on Amount of 3M Fastbond ™ Insulation Adhesive (gsm) | Total (gsm) |
|---|---|---|---|
| A | 40.0 | 10.0 | 50.0 (A2) |
| B | 45.0 | 5.0 | 50.0 (B2) |
| C | 50.0 | 0 | 50.0 (C2) |

Samples D and E of the basic padformed structures formed in Example 1, see Table 1, were each trimmed to 0.3556 meters by 0.3556 meters (14 inch by 14 inch). One surface of substrate D was sprayed with a water-based adhesive available as 3M Fastbond™ Insulation Adhesive produced by 3M, and the product cured in a laboratory oven at 150° C. for 15-20 minutes to produce D-1. The procedure was repeated using an acrylic vinyl acetate copolymer available as DURO-SET® manufactured by Vinamul® as the spray-on adhesive emulsion to produce D-2, and a very soft acrylic binder available as FLEXCRYL® 1625 produced by Air Products as the spray-on adhesive emulsion to produce D-3. The basis weight of Samples D-1, D-2 and D-3 after adhesive add-on was 100 gsm. Sample E from Example 1 with a 100.0 gsm basis weight served as the control for this experiment. The samples were sticky to the touch.

DUR-O-SET® is a high-solids, surfactant stabilized ethylene-vinyl acetate terpolymer emulsion with a pH of 4.5-5.5 and a solids content of 55-60 percent.

FLEXCRYL® 1625 is a high-solids water-based vinyl acrylate pressure sensitive adhesive with a solids content of about 68 percent, a pH of about 5, a Tg of about −48° C. It is sold as a carboxylated acrylic emulsion and manufactured by Air Products.

Table 4 below shows the type and amount of adhesive add-on to each substrate.

TABLE 4

Composition of 100.0 gsm Padformed Samples

| Experimental Padformed Substrate | | D-1 | D-2 | D-3 | E |
|---|---|---|---|---|---|
| Substrate Basis Weight (gsm) | | 80.0 | 80.0 | 80.0 | 100.0 |
| Adhesive | 3M Fastbond ™ | 20.0 | 0 | 0 | 0 |
| | DUR-O-SET® | 0 | 20.0 | 0 | 0 |
| | FLEXCRYL® 1625 | 0 | 0 | 20.0 | 0 |
| Total (gsm) | | 100.0 | 100.0 | 100.0 | 100.0 |

Figure 2:
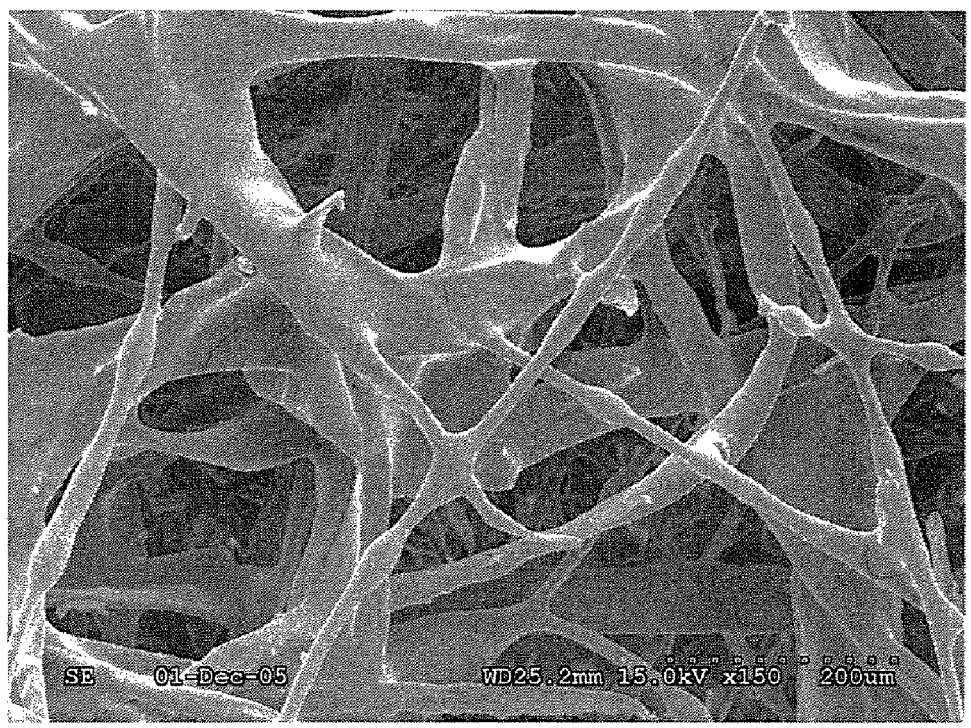
FIG. 2 presents a photograph of a padformed sample taken at a magnification of 150×.

FIG. 2 presents a photograph of padformed sample D-3 taken at a magnification of 150×. Unless otherwise indicated, this and all other images presented herein were taken in-house using a HITACHI® S-3500N Scanning Electron Microscope.

Example 4

Dust Capture Performance

The performance of the five padformed barrier substrates and the two controls was tested to explore their dust capturing capacities. The material used was a silica-based material available as Arizona Test Dust (A.T.D.), manufactured by Powder Technology, which is used to test filters and has particles that range in size from 0.807-μm to 78.16-μm.

0.2032 meter (8-inch) diameter circles from each of the test samples were cut and were each positioned with adhesive side down on an ASTM No. 30 (600-μm) sieve of a RO-TAP® Testing Sieve Shaker Model B. A bottom pan was placed below the No. 30 screen. Approximately 0.5-grams of A.T.D. was deposited in the center of the non-adhesive surface of the test substrate and the dust then permitted to permeate through the sample by RO-TAP® oscillations for a duration of 30 minutes. The RO-TAP® instrument has 278 uniform oscillations per minute and 150 taps per minute as specified by ASTM standards.

Complete instructions and procedures on the use and calibration of testing sieves are contained in ASTM STP447B. Note that in standard RO-TAP® applications, sieve analysis results from two testing sieves of the same sieve designation may not be the same because of the variances in sieve opening permitted by this specification. To minimize the differences in sieve analysis results, the use of testing sieves matched on a performance basis is suggested. ASTM STP447B also contains a list of all published ASTM standards on sieve analysis procedures for specific materials or industries. This list may be referenced to obtain statements of precision and bias for sieve analysis of specific materials. Since the RO-TAP® Testing Sieve Shaker was used, in the case of this experiment, for its agitation capabilities (which permitted a subsequent measurement of the dust holding capacity of the test substrates), and not for classification of particle sizes, minor variations in mesh size of testing sieves used should not make a difference.

The percent of A.T.D. that remained associated with the substrates after oscillation was then calculated. Table 5 below summarizes the performance results.

TABLE 5

Summary of Dust Capturing Capacity of 50-gsm and 100-gsm Padformed Barrier Substrates

| | Sample | | | | | | |
|---|---|---|---|---|---|---|---|
| | A2 | B2 | C2 | D-1 | D-2 | D-3 | E |
| % Dust held by Pad after RO-TAP® Oscillation | 68.2% | 47.8% | 5.61% | 72.4% | 82.6% | 86.9% | 45.1% |

The RO-TAP® laboratory tests suggest that Sample D-3, the 100-gsm pad with FLEXCRYL® 1625, has the best dust holding capacity of the substrates tested.

Figure 3:
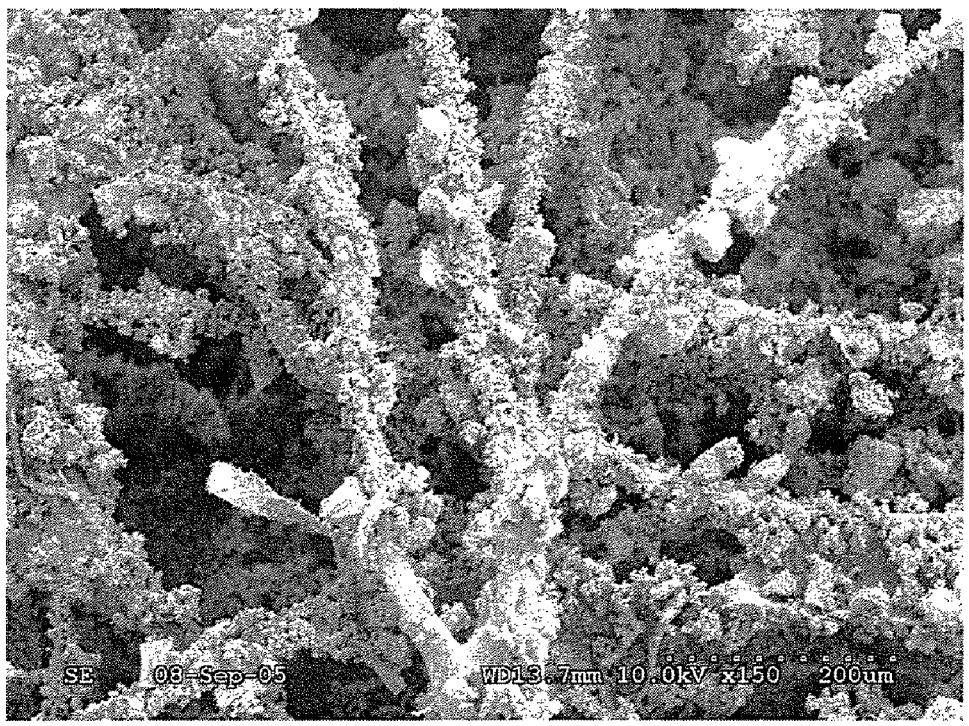
FIG. 3 shows a scanning electron micrograph of a padformed sample with dust retention taken at a magnification of 150×.

FIG. 3 shows a scanning electron micrograph of the padformed sample D-3. Arizona Test Dust retained after a Dust Capture Performance Test is visible. The image is at a magnification of 150×.

Example 5

Pilot Samples of Allergen Barrier Material

A sample of the basic NTL3 nonwoven product prepared in Example 2, see Table 2, was sprayed on one surface with a very soft acrylic adhesive, FLEXCRYL® 1625 produced by Air Products, and air-dried for several hours. A sample of NTL3 without adhesive add-on served as the control for this portion of the experiment. Table 6 below shows the amount of adhesive add-on to the substrates.

TABLE 6

Composition of NTL3 Pilot Samples

| Experimental Sample | Substrate Basis Weight (gsm) | Add-on Amount of Flexcryl® 1625 Adhesive (gsm) | Total (gsm) |
|---|---|---|---|
| NTL3 Substrate 1 | 69.9 | 20.0 | 89.9 |
| NTL3 Control | 69.9 | 0 | 69.9 |

Figure 4:
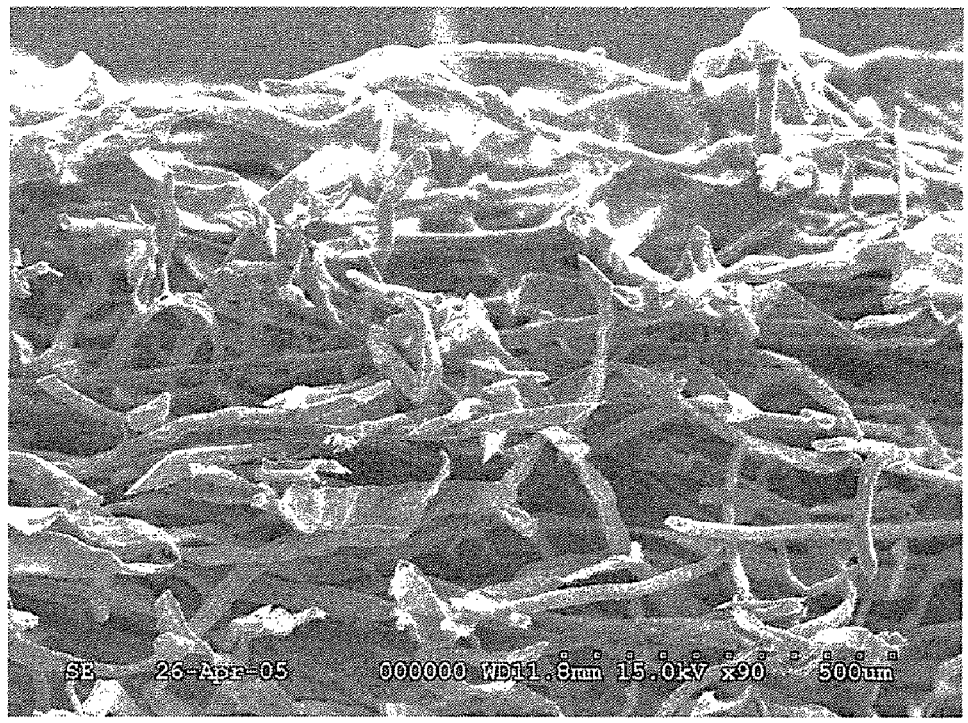
FIG. 4 is a micrograph of a cross-section of a Pilot Plant sample of NTL3, Substrate 1 coated with the Flexcryl 1625 adhesive. The image is magnified at 90×.

FIG. 4 is a micrograph of a cross-section of the Pilot Plant sample of NTL3, Substrate 1 coated with the Flexcryl 1625 adhesive. The image is magnified at 90×. The micrograph of FIG. 4 shows the low density nature of the barrier fabric as well as the penetration of the adhesive through the top half of the material.

The performance of the pilot samples was tested in multiple ways.

Phase 1. The first phase of testing of the prepared substrates sought to explore the dust-trapping capacity of the nonwoven NTL3 Substrate 1. The material used, as in the case of the padformed samples, was a silica-based dust, Arizona Test Dust (A.T.D.), manufactured by Powder Technology. The procedure described in Example 4 using the RO-TAP® Sieve Shaker was used to analyze the pilot samples.

Table 7 summarizes the performance results from Phase 1.

TABLE 7

Summary of Dust Capturing Capacity of Pilot Substrate

|  | Sample | |
| --- | --- | --- |
|  | NTL3 Substrate 1 | NTL3 Control |
| % Dust held by Substrate after RO-TAP ® Oscillation | 88.8% | 21.63% |

The closer the values are to 100 percent, the higher is the measured efficiency of the nonwoven material as a filter and a sticky trap that is able to capture and hold microscopic dust-like particles. Potentially, NTL3 Substrate 1 could have a filtering efficiency approaching 100% if the A.T.D. is applied as an even dispersion, and is not deposited in its entirety at the center of the substrate, where there is a propensity to overload the holding capacity of the material at the center.

Figure 5:
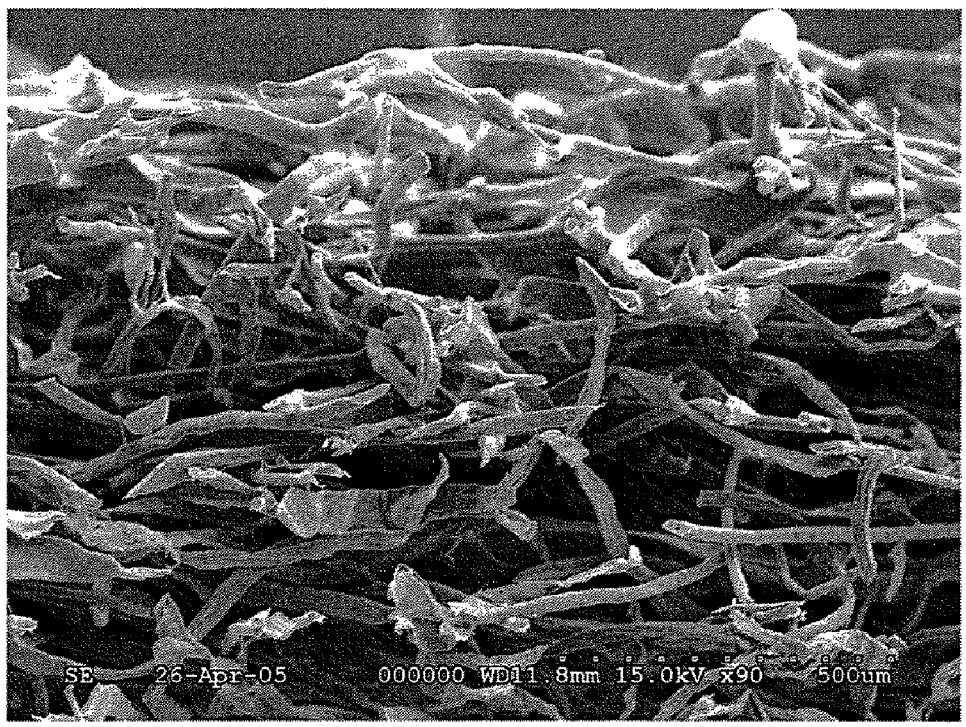
FIG. 5 is a micrograph image of nonwoven material NLT3 substrate after a 25-day test.

Phase 2. The second phase of testing involved cutting 0.6096-meter by 0.6096-meter (2-feet by 2-feet) squares of NTL3 Substrate 1 and applying it, adhesive side down, to a mattress with only a sheet over it and to a pillow inside of a pillowcase that were in consistent use. The nonwoven material remained adhered to the mattress and pillow for a duration of 25 days and were subject to the normal wear and tear and pressure brought about by the occupants of the bed. The nonwoven barriers remained intact at the end of this period, indicating that it was of sufficient basis weight and durability to be able to withstand use while adhered to mattress and pillow in regular use. FIG. 5 is an image of the material after the 25 day test.

Figure 6:
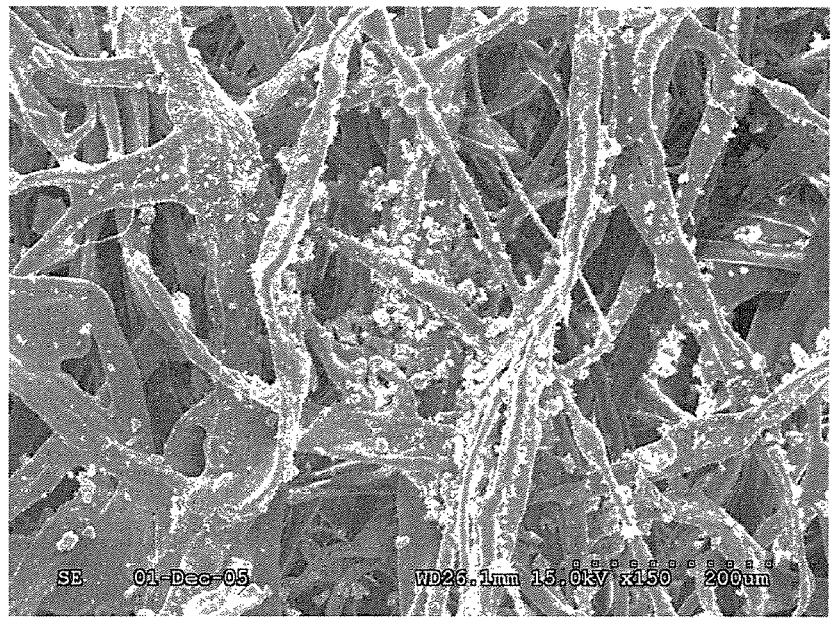
FIG. 6 is a micrograph image of an NTL3 layer after a 25 day test period where the magnification is set at 150×.

FIG. 6 presents another micrograph taken after 25 days of use. The micrograph was taken at a magnification of 150× (WD=26.1 mm, kV=15). The micrograph shows that the NTL3 layer is intact and has trapped many particles during the 25 day period.

Figure 7:
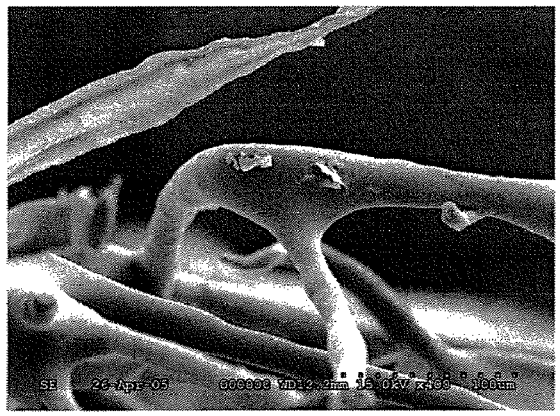
FIG. 7 provides a micrograph of the layers after 25 days of use at a magnification of 400×.
Figure 8:
FIG. 8 provides a micrograph of the layers after 25 days of use at a magnification of 800×.

FIGS. 7 and 8 present additional micrographs taken after 25 days of use. The micrographs were taken at increased magnifications of 400× and 800×, respectively. Entrapped particles are more clearly seen.

Phase 3. The next phase of testing NTL3 Substrate 1 occurred under the supervision of entomologist and acorologist Dr. Glen R. Needham, Ph.D. Dr. Needham is on faculty at The Ohio State University (OSU) in the Department of Entomology. The University test facility is located in Columbus, Ohio. Phase 3 testing is described in detail in Example 6.

Example 6

Dust Mite Trapping

Samples of NTL3 Substrate 1 were shipped to OSU for a preliminary Trap Test that would examine dust mite adherence and movement. The experiment involved cutting small circles of NTL3 Substrate 1 and of mattress ticking material to fit the bottom of a glass Petri dish. The mattress ticking was first placed at the bottom of the dish. Approximately 20 live mites from a culture were placed on the FLEXCRYL® 1625 side of the NTL3 Substrate 1 disc. This sample was then inverted and placed on the mattress ticking in the Petri dish. It was held next to the ticking by a fine steel wire mesh placed on top of the NTL3 Substrate 1 sample. The sides of the Petri dish were lined with petroleum jelly to keep the mites from crawling out of the dish. The experiment was allowed to proceed overnight. The following day, it was observed that the mites placed on the adhesive surface of NTL3 Substrate 1 showed evidence of movement of their extremities, indicating that they were still alive, but there was considerable impediment to locomotion due to the trapping ability and adhesive drag of the FLEXCRYL® 1625 adhesive.

Figure 9:
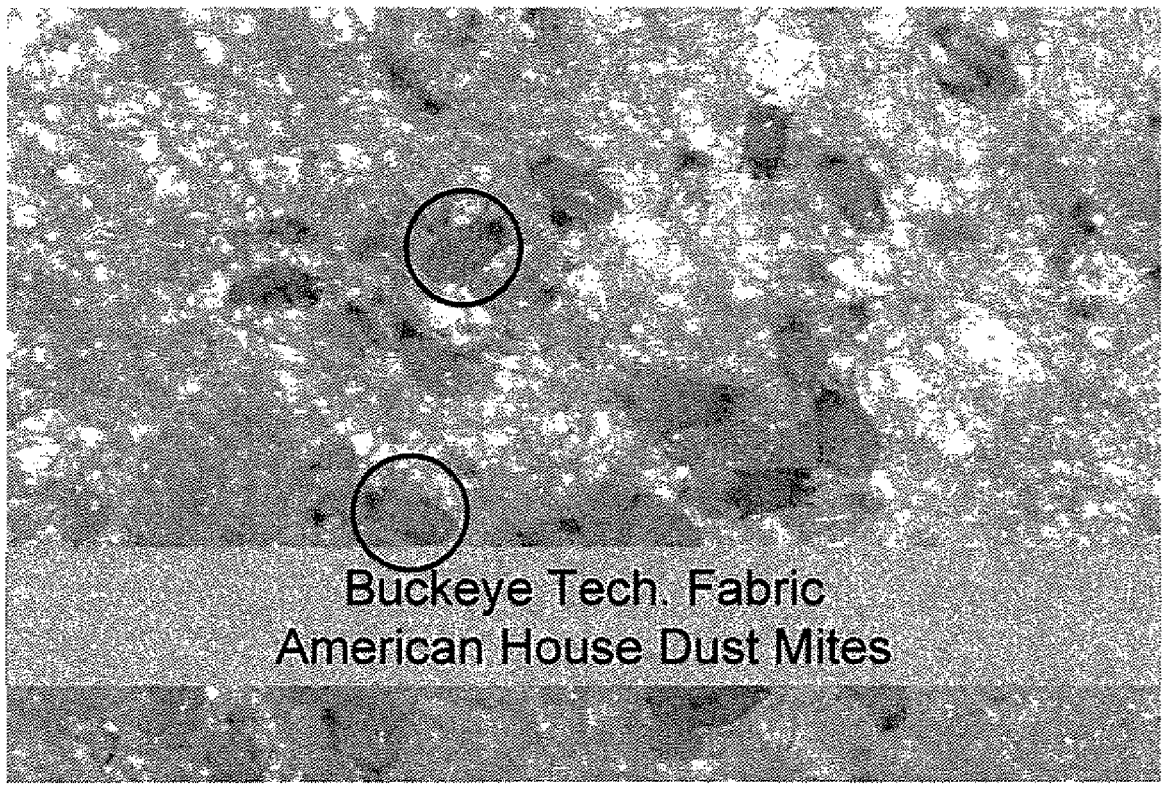
FIG. 9 provides a still image of an NTL3 substrate with American house dust mites. All but 2 dust mites (circled) were immobilized by an NTL3 adhesive barrier.

Mite appearance and behavior on NTL3 Substrate 1 was recorded in real time using a video camera as shown in FIG. 9. See FIG. 9 for a still image from Dr. Needham's video clip showing all but two dust mites (circled) immobilized by the NTL3 adhesive barrier.

Figure 10:
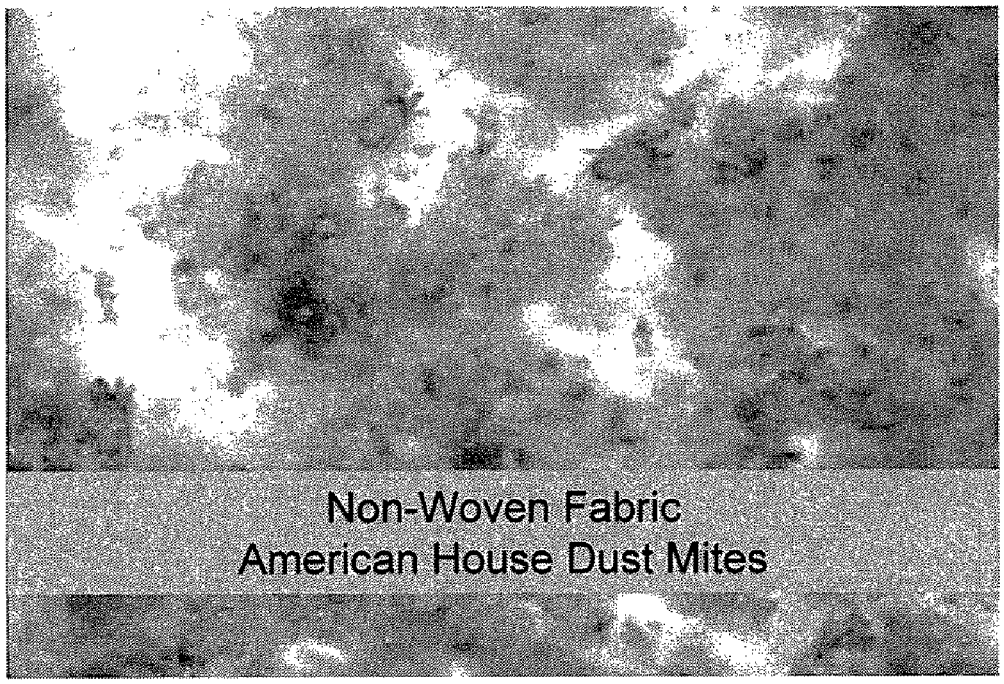
FIG. 10 provides a still image from a video showing all dust mites moving freely on a mattress encasement product without adhesive.

The experiment was repeated using a commercially available synthetic nonwoven mattress barrier for comparison to NTL3 Substrate 1. At the end of the experiment, it was observed that, in this case, the mites were freely moving about, unaffected by the barrier layer. FIG. 10 presents a still image from a video showing all of the dust mites moving freely on a known mattress encasement product.

It was concluded that NTL3 Substrate 1 functioned very effectively as a trap for dust mites as all but two mites were trapped within the adhesive of the sample and incapacitated as a result, as indicated in FIG. 9.

Figure 11:
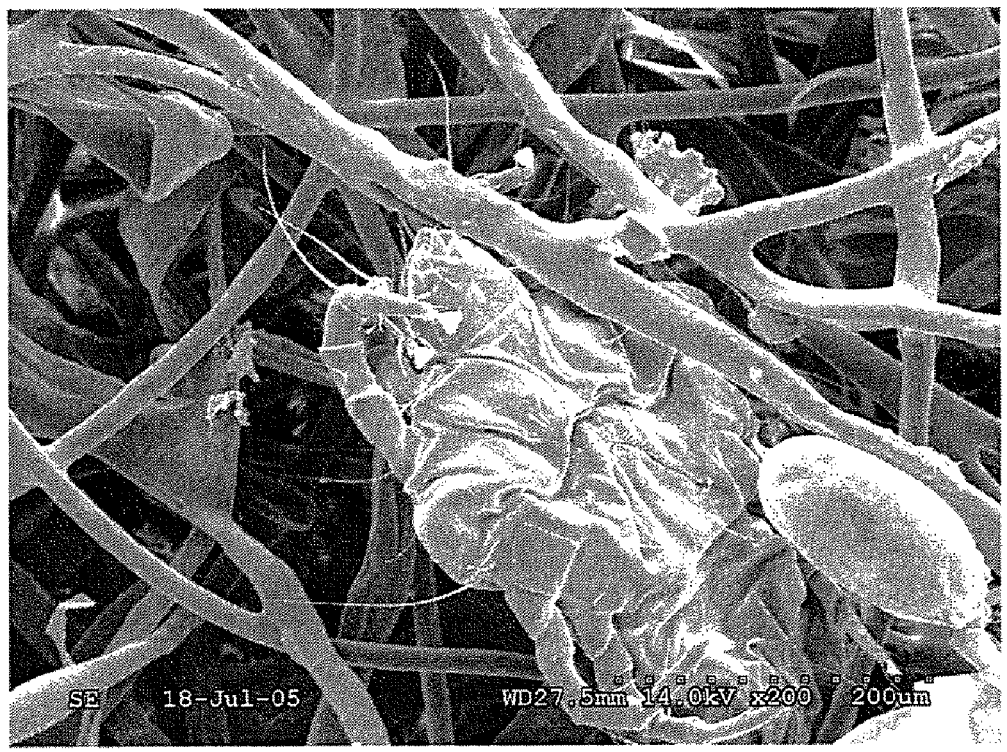
FIG. 11 presents a micrograph showing a dried dust mite a dust mite larva trapped by an NTL3 substrate 1 barrier material at 200× magnification.
Figure 12:
FIG. 12 presents a micrograph showing a dust mite trapped by an NTL3 substrate 1 barrier material at 180 magnification.

FIG. 11 presents a micrograph showing a dust mite and dust mite larva having been trapped by the NTL3 Substrate 1 barrier material. This, again, was in conjunction with Dr. Glen Needham's experiment at The Ohio State University. The image is magnified 200× to more clearly show features of the dust mite. It is noted that the mite appears flat because the sample was dessicated in a drying oven to preserve the sample. FIG. 12 presents another micrograph showing a dust mite trapped by the NTL3 Substrate 1 barrier material. The image is magnified 180× to more clearly show features of the dust mite. It can be seen that the dust mite was initially captured by the adhesive. The mite molted, moved, and then was recaptured by the barrier fabric.

Example 7

Clinical Testing

Barrier samples obtained from Example 6 were sent for testing to IBT Reference Laboratory located in Lenexa, Kans., a national research and specialty clinical lab that provides a wide range of tests and services in the area of allergy, clinical immunology and molecular biology. Buckeye's NTL3 Substrate 1 was tested for specific allergen barrier properties using a modified Fussnecker filtration apparatus.

This apparatus is based on the design reported by Vaughn, J W et al (*JACI* 1999; 103: 227-231). The procedure involved calibrating airflow measurements through the NTL3 Substrate 1 against a fabric control with a known airflow rate. Next, 500-mg of a dust sample containing known amounts of feline Fel d1 and dust mite Der f1 allergens were pulled across each fabric. A filter cassette mounted downstream from the fabric collected any allergen that was able to penetrate the fabric. The filter was then extracted in 2.0 mL of 1% bovine serum albumin (BSA) in phosphate buffered saline (PBS)-Tween 20 overnight. The extract was assayed the following day with an Enzyme-Linked Immunosorbent Assay (ELISA) for the relevant allergen. The detection limits of the airflow test for the Fel d1 allergen and the Der f1 allergen are 0.31 ng and 1.3 ng respectively. If results fall below the detection limits of the test, it can be concluded that the fabric being tested is an effective barrier to Fel d1 and Der f1 allergen transfer. The Allergen Barrier Test was performed on a sample of NTL3 Substrate 1, as well as on a high porosity barrier fabric labeled "High Fabric Control" and on a low porosity barrier fabric labeled "Low Fabric Control." Table 8 below summarizes results obtained from IBT Reference Laboratory on the Allergen Barrier Test.

TABLE 8

Results of Allergen Barrier Test with Airflow Device on NTL3 Substrate 1

| Sample Identification | Airflow through Fabric (L/min) | Fel d1 (ng) | Der f1 (ng) |
| --- | --- | --- | --- |
| NTL3 Substrate 1 | 33.7 | 34.6 | <1.3 |
| High Fabric Control | 34.4 | 2483.7 | 190.2 |
| Low Fabric Control | 18.6 | <0.31 | <1.3 |
| Dosed Dust Control | NA | 61623 | 478 |

Allergen Barrier Test data from IBT show the following. The NTL3 Substrate 1 experimental barrier was almost as porous as the high porosity High Fabric Control, permitting a substantial volume of airflow through the fabric. The NTL3 Substrate 1 barrier had almost twice the airflow of the low porosity Low Fabric Control. When compared to the High Fabric Control with the similar porosity, the NTL3 Substrate 1 decreased the Fel d1 feline allergen by 99% and reduced the Der f1 dust mite allergen to below detectable limits. The NTL3 Substrate 1 had the airflow of a high porosity fabric, while it performed almost as effectively as a low porosity fabric in blocking feline and dust mite allergens.

Example 8

Other Adhesives

A sample of the basic airlaid structure, NTL3 formed in Example 2 (Table 2) was sprayed on one surface with a 9.77% aqueous solution of NACOR® 38-088A, produced by Natural Starch, and air-dried for several hours to produce NTL3-15 to produce an effective add-on of 14.5 gsm. Another NTL3 sample was sprayed with a 15% aqueous solution of NACOR® 38-088A to produce NTL3-30 an effective add-on of 29.5 gsm.

NACOR® 38-088A is an aqueous emulsion of an acrylic copolymer with a solids content of 52 percent and a pH of 7.0 with a 180 24 hour peel from stainless steel of 70 oz/in and a shear at 22 C of 8 hours at 4 psi and a tack of 32 oz/in$^2$. NACOR is available from National Starch and Chemical Co. of Bridgewater, N.J.

Table 9 below shows the amount of adhesive add-on to each of the two substrates. Note that although the substrate used was the same one as the basic airlaid NLT3 formed in Example 2, formation irregularities in airfelts causes the basis weight to differ slightly from area to area.

TABLE 9

Composition of NTL3 Control with NACOR® 38-088A

| Experimental Sample | Substrate Basis Weight (gsm) | Add-on Amount of NACOR® 38-088A Adhesive (gsm) | Total (gsm) |
| --- | --- | --- | --- |
| NTL3-15 | 62.1 | 14.5 | 76.6 |
| NTL3-30 | 65.4 | 29.5 | 94.9 |

NLT3-15 and NLT3-30 barrier samples were tested by IBT Reference Laboratory using the procedure described above. Table 10 below summarizes results obtained from IBT Reference Laboratory on the Allergen Barrier Test.

TABLE 10

Results of Allergen Barrier Test with Airflow Device on NLT3-15 and NLT3-30

| Sample Identification | Airflow through Fabric (L/min) | Fel d1 (ng) | Der f1 (ng) |
| --- | --- | --- | --- |
| NLT3-15 | 35.4 | 57.5 | <1.3 |
| NLT3-30 | 35.5 | 26.7 | <1.3 |
| High Fabric Control | 35.7 | 2381.6 | 161.3 |
| Low Fabric Control | 18.8 | <0.31 | <1.3 |
| Dosed Dust Control | NA | 61623 | 478 |

The Allergen Barrier Test data from IBT show the following. The NTL3-15 and NTL3-30 experimental barrier substrates were virtually as porous as the high porosity High Fabric Control, permitting a substantial volume of air through the fabric. The NTL3-15 and NTL3-30 experimental barrier substrates had almost twice the airflow of the low porosity Low Fabric Control. When compared to the High Fabric Control with the similar porosity, the NTL3-15 substrate decreased the Fel d1 feline allergen by 98% and reduced the Der f1 dust mite allergen to below detectable limits. When compared to the High Fabric Control with the similar porosity, the NTL3-30 substrate decreased the Fel d1 feline allergen by 99% and reduced the Der f1 dust mite allergen to below detectable limits. The NTL3-15 and NTL3-30 substrates had the airflow of a high porosity fabric, while they performed almost as effectively as a low porosity fabric in blocking feline and dust mite allergens.

NLT3-15 and NLT3-30 with FDA-approved NACOR® 38-088A were as effective as NLT3 Substrate 1 with FLEXCRYL® 1625 in blocking and trapping feline and dust mite allergens. Based on the similarity in effective function of the NLT3-15 and NLT3-30 barriers, it was concluded that a NACOR® 38-088A add-on of 20.0 gsm to NLT3 would be adequate for routine use as a dust mite barrier and trap on mattresses and pillows and in air filters.

Example 9

Filter Substrate for Active Particulate

A sample of the basic airlaid structure NLT3 formed in Example 1 was trimmed to 0.0508-m by 0.0508-m (2 inches by 2 inches). It was then sprayed on one surface with a very soft acrylic binder, available as FLEXCRYL® 1625 produced by Air Products, and air-dried for several hours. Granular Activated Carbon available from Sigma Chemical Company was ground with a mortar and pestle. It was sieved using a U.S.A. Standard Test Sieve No. 200. The fine carbon powder was then applied to the prepared NLT3-FLEXCRYL® 1625 substrate. Any fine carbon that was unattached to the substrate was removed with compressed air, leaving the substrate with only non-removable activated carbon. The effective add-on of non-removable activated carbon was 19.78% of the total weight of the product, referred to as NLT3-Carbon.

Table 11 below shows the composition of the product.

TABLE 11

Composition of NTL3-Carbon

| Experimental Sample | NLT3 Substrate Basis Weight (gsm) | Add-on Amount of FLEXCRYL® 1625 (gsm) | Add-on Amount of Activated Carbon | Total (gsm) |
|---|---|---|---|---|
| NTL3-Carbon | 69.9 | 20.0 | 43.0 | 132.9 |

NTL3-Carbon could be used as an active filter. Activated carbon is a charcoal that is treated with oxygen in order to open up millions of tiny pores between the carbon atoms, resulting, in a highly adsorbent material. Also, this type of substrate may be used to support any types of particles which adhere to the adhesive, enabling the customization of the filter media.

Figure 13:
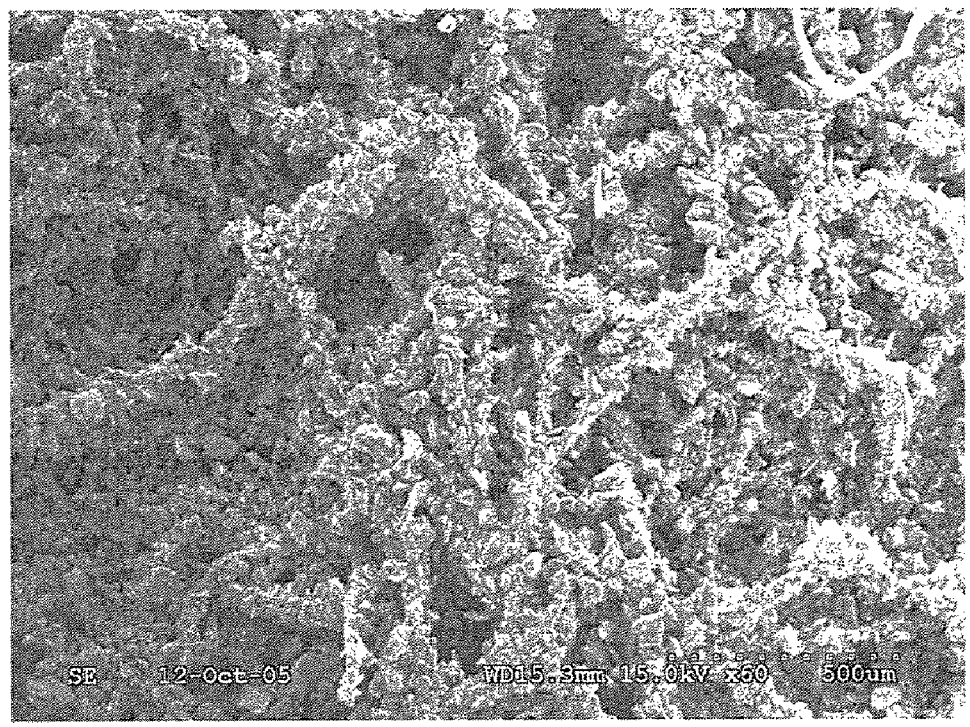
FIG. 13 presents a micrograph showing the filter media having captured 200 mesh activated carbon applied to an NTL3 Substrate 1 barrier fabric at a magnification of 60×.
Figure 14:
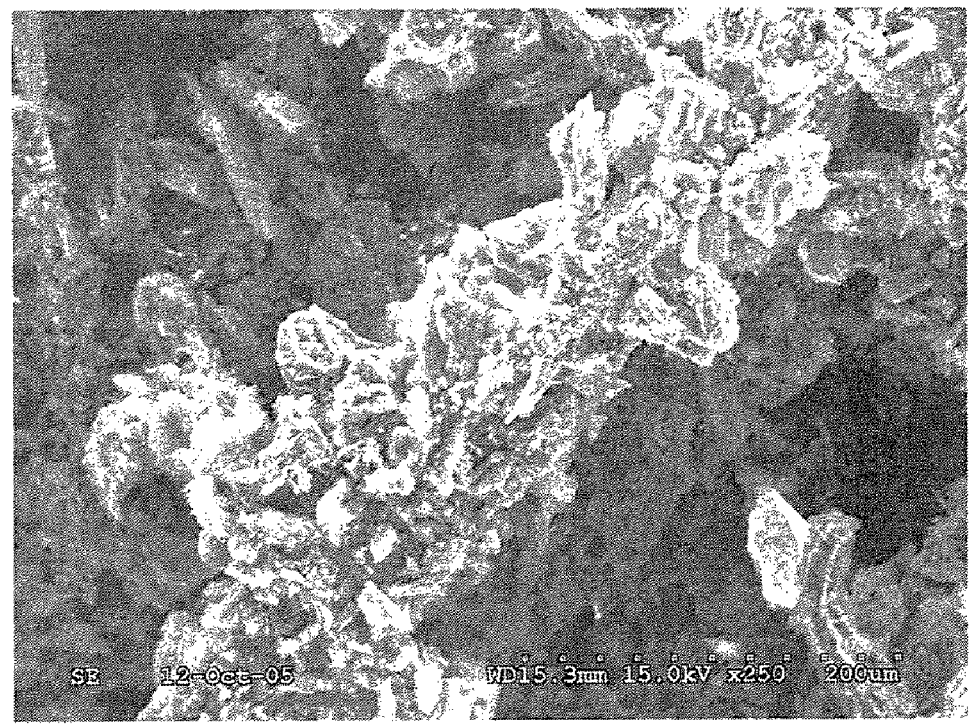
FIG. 14 presents a micrograph showing the filter media having captured 200 mesh activated carbon applied to an NTL3 Substrate 1 barrier fabric at a magnification of 250×.
Figure 15:
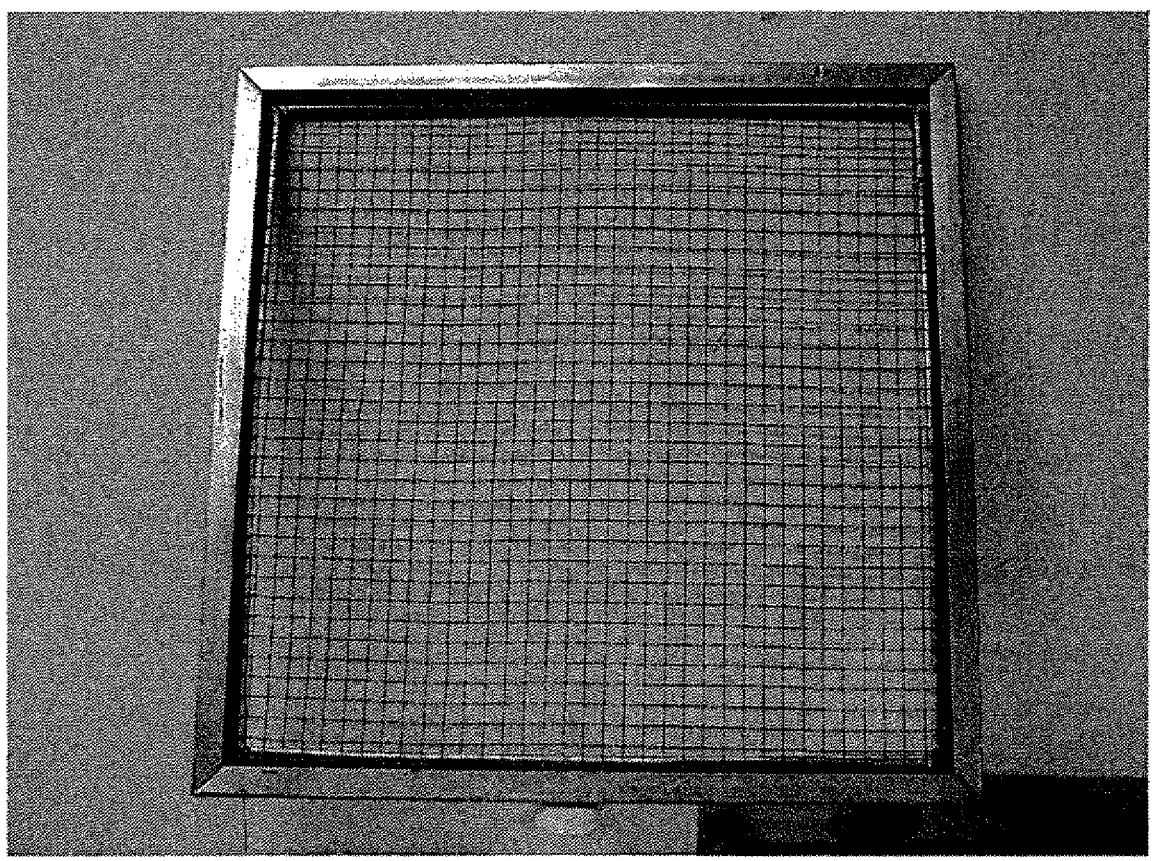
FIG. 15 shows an image of a representative frame used for ASHRAE 52.2 testing at Blue Heaven Technologies.
Figure 16:
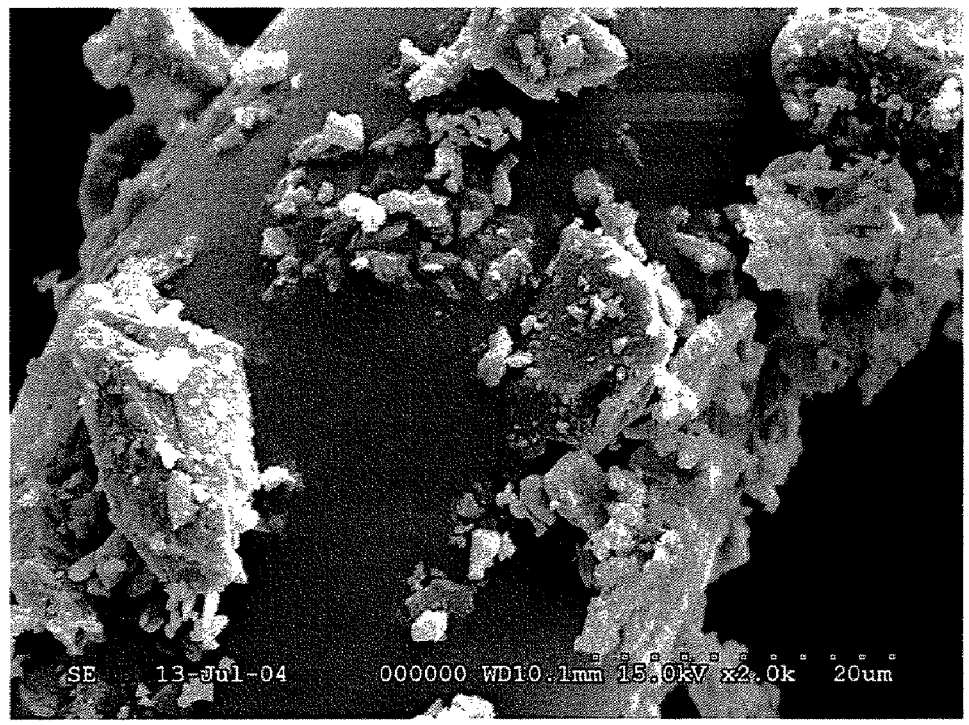
FIG. 16 provides a scanning electron micrograph of NTL3 taken at a magnification of 2000× illustrating dust re-wetting capability of FLEXCRYL® 1625.

FIGS. 13 and 14 present micrographs showing the filter media having captured activated carbon. The micrographs were taken at magnifications of 60× and 250×, respectively. Carbon particles are even more clearly seen. The activated carbon particles will aid in trapping odors and chemicals.

Example 10

Filtration Media Substrate

Three airlaid substrates designated AFM-1, AFM-2, and AFM-3 were prepared on a DannWebb pilot scale airlaid manufacturing unit at Buckeye Technologies, Inc., Memphis, Tenn. The raw materials in all three substrates consisted of a southern softwood Kraft fluff pulp, available as FOLEY FLUFFS® from Buckeye Technologies Inc., Memphis, Tenn., bicomponent binder fiber with a polyethylene sheath over a polyester core available as Type T-255 with merge number 1663, made by Trevira GmbH of Bobingen, Fibervision™ AL 4-Adhesion bicomponent fibers produced by Fibervisions, an ethyl vinyl acetate latex binder available as AIRFLEX® 192 manufactured by Air Products and an acrylic waterborne pressure sensitive adhesive available as NACOR® 38-088A, manufactured by the Adhesives Division of National Starch & Chemical Company. Trevira's T-255 Merge No. 1663 bicomponent fiber has a denier of 2.2-dtex, and is 0.003-meter (3-mm) in length, with a 50/50 ratio of polyester to polyethylene. Fibervision™ AL 4-Adhesion bicomponent fibers consist of a polypropylene core and a polyethylene sheath. The produced airlaid structures, AFM-1, AFM-2 and AFM-3, had total basis weights of 106.5 gsm, 106.5 gsm, and 113.5 gsm respectively.

The pilot substrate AFM-1 was prepared according to the composition given in Table 12 on the pilot line.

TABLE 12

Composition of AFM-1

| Component of Substrate | Gsm |
|---|---|
| Southern Softwood Pulp - FOLEY FLUFFS ® | 40.0 |
| Bicomponent Fiber (PET/PE) - Trevira 1663 | 9.0 |
| Fibervision ™ AL-Adhesion Fiber | 36.0 |
| EVA Latex Binder Spray - AIRFLEX ® 192 | 1.5 |
| Pressure Sensitive Adhesive - NACOR ® 38-088A | 20.0 at 15.0% solids content |
| Total Basis Weight (gsm) | 106.5 |

The pilot substrate AFM-2 was prepared according to the composition given in Table 13 on the pilot line.

TABLE 13

Composition of AFM-2

| Component of Substrate | Gsm |
|---|---|
| Southern Softwood Pulp - FOLEY FLUFFS ® | 40.0 |
| Bicomponent Fiber (PET/PE) - Trevira 1663 | 9.0 |
| Fibervision ™ AL-Adhesion Fiber | 36.0 |
| EVA Latex Binder Spray - AIRFLEX ® 192 | 1.5 |
| Pressure Sensitive Adhesive - NACOR ® 38-088A | 20.0 at 10.0% solids content |
| Total Basis Weight (gsm) | 106.5 |

AFM-1 and AFM-2 were prepared individually in three layers. The first forming head added a mixture of 40.0 gsm of FOLEY FLUFFS® pulp and 9.0 gsm of Trevira 1663 bicomponent fibers. The second forming head added 36.0 gsm of Fibervision™ AL 4-Adhesion. Immediately after this, the web was compacted via the compaction roll at 4.3 bars. Then, 20.0 gsm NACOR® 38-088A pressure-sensitive adhesive at 15.0% mixture solids content (AFM-1), or at 10.0% mixture solids content (AFM-2) was sprayed onto the top of the web. The web was cured in a Moldow Through Air Tunnel Dryer at a temperature of 140° C. After this, the web from each condition was wound as a 20-inch diameter roll. The roll was then unwound and run back through the pilot line and 1.5 gsm AIRFLEX®-192 latex emulsion was applied onto the reverse side of the web. The machine speed was 15 meters/minute.

The substrate, AFM-3, was also prepared on a DannWebb pilot scale airlaid manufacturing unit at Buckeye Technologies, Inc., Memphis, Tenn. This substrate was identical in manufacture and composition to AFM-1 and AFM-2, with the exception of the gsm add-on of the pressure sensitive adhesive, NACOR® 38-088A.

The pilot substrate AFM-3 was prepared according to the composition given in Table 14 on the pilot line.

TABLE 14

Composition of AFM-3

| Component of Substrate | Gsm |
|---|---|
| Southern Softwood Pulp - FOLEY FLUFFS ® | 40.0 |
| Bicomponent Fiber (PET/PE) - Trevira 1663 | 9.0 |
| Fibervision ™ AL-Adhesion Fiber | 36.0 |
| EVA Latex Binder Spray - AIRFLEX ® 192 | 1.5 |
| Pressure Sensitive Adhesive - NACOR ® 38-088 | 27.0 at 20.0% solids content |
| Total Basis Weight (gsm) | 113.5 |

The filtration efficiency performance of the 3 substrates prepared at the pilot plant was tested off-site at Blue Heaven Technologies, located in Louisville, Ky.

The experiment performed at Blue Heaven involved cutting the 3 substrates (AFM-1, AFM-2, and AFM-3) to a size of 24-inches by 24-inches, affixing them each to a 24-inch by 24-inch by 1-inch frame (FIG. 15), and sealing it in an ASHRAE (American Society of Heating, Refrigerating and Air-Conditioning Engineers) standard 52.2-1999 test duct. ASHRAE Standard 52.2-1999 entitled "Method of Testing General Ventilation Air Cleaning Devices for Removal by Particle Size" is a standardized laboratory test method and HVAC industry standard for measuring the filtration efficiency of ventilation air filters used in residential and commercial buildings. The substrates, AFM-1, AFM-2, and AFM-3, were oriented in the test duct in such a way that the side with the Fibervision™ AL 4-Adhesion bicomponent fibers layer faced upstream.

The airflow in the ASHRAE standard 52.2-1999 test duct was then set at a constant value of 472 cfm. A test aerosol was injected upstream of the substrates while a particle counter was used to count the number of particles upstream and downstream of the substrates in 12 size ranges from 0.3-10 μm diameter. This particular size range is chosen in order to test a filter's ability to filter respirable size particles. The ratio of the downstream counts to the upstream counts was used to compute the filtration efficiency of AFM-1, AFM-2, and AFM-3 for each of the 12 size ranges. Based on the minimum filtration efficiencies observed during the test of the substrates, the analyst at Blue Heaven Technologies was able to assign each of the substrates a MERV value as defined by the ASHRAE Standard 52.2 test method. MERV is the "Minimum Efficiency Reporting Value" for a filter. It is assigned to a substrate depending on its particle filtering efficiency (PSE) in three different particle size ranges (0.3 to one micrometer, one to three micrometers, and three to 10 micrometers). The MERV value is an indication of the minimum efficiency that can be expected from that particular filter substrate, and is an excellent representation of filter performance. This number is also intended to help people compare filters.

Table 15 below summarizes results obtained from Blue Heaven Technologies on the three filter substrates, AFM-1, AFM-2, and AFM-3.

TABLE 15

ASHRAE 52.2 Test Data on AFM-1, AFM-2, and AFM-3

| Filtration Pilot Plant Substrate | AFM-1 | AFM-2 | AFM-3 |
|---|---|---|---|
| Airflow Rate (CFM) | 472 | 472 | 472 |
| Nominal Face Velocity (fpm) | 118 | 118 | 118 |
| Initial Resistance (in WG) | 0.10 | 0.12 | 0.10 |
| E1 (%) Initial Efficiency 0.30-1.0-um | 1 | 2 | 1 |
| E2 (%) Initial Efficiency 1.0-3.0-um | 27 | 35 | 28 |
| E3 (%) Initial Efficiency 3.0-10.0-um | 66 | 73 | 65 |
| Estimated Minimum Efficiency Reporting Value (MERV) | MERV 7 @ 472 CFM | MERV 8 @ 472 CFM | MERV 7 @ 472 CFM |

Based on the ASHRAE Standard 52.2 test results, the following conclusions were made.

The substrate AFM-2 had the highest percent filtration efficiency in all of the three different particle size ranges (0.3 to one micrometer, one to three micrometers, and three to 10 micrometers).

Consequently, at a MERV 8 at an airflow rate of 472 CFM, Substrate AFM-2 exhibited the best filter performance of the three substrates.

Based on the data, it is evident that the differences in the formulation and quantity of application of the solution of NACOR® 38-088A, the pressure sensitive adhesive used in the preparation of substrates AFM-1, AFM-2, and AFM-3, resulted in a difference in filtration efficiency as represented by the MER value.

Based on the data generated from substrate AFM-2 led to a secondary experiment at Blue Heaven Technologies. The procedure in this case involved generating a fourth substrate by placing two samples of the substrate AFM-2 together in the same orientation. This substrate will henceforth be referred to as AFM-2X2. The substrate AFM-2X2 had the composition listed in Table 16.

TABLE 16

Composition of AFM-2X2

| Component of Substrate | Gsm |
|---|---|
| Southern Softwood Pulp - FOLEY FLUFFS ® | 80.0 |
| Bicomponent Fiber (PET/PE) - Trevira 1663 | 18.0 |
| Fibervision ™ AL-Adhesion Fiber | 72.0 |
| EVA Latex Binder Spray - AIRFLEX ® 192 | 3.0 |
| Pressure Sensitive Adhesive - NACOR ® 38-088A | 40.0 at 10.0% solids content |
| Total Basis Weight (gsm) | 213.0 |

AFM-2X2 was then subjected to the identical ASHRAE Standard 52.2-1999 test as the previous substrates. As before, the substrate was oriented in the test duct in such a way that the side with the top layer of Fibervision™ AL 4-Adhesion bicomponent fibers faced upstream.

Table 17 below summarizes results obtained from Blue Heaven Technologies on the filter substrate, AFM-2X2.

TABLE 17

ASHRAE 52.2 Test Data on AFM-2X2

| Airflow Rate (CFM) | 472 |
|---|---|
| Nominal Face Velocity (fpm) | 118 |
| Initial Resistance (in WG) | 0.23 |
| E1 (%) Initial Efficiency 0.30-1.0-um | 6 |
| E2 (%) Initial Efficiency 1.0-3.0-um | 54 |
| E3 (%) Initial Efficiency 3.0-10.0-um | 91 |
| Estimated Minimum Efficiency Reporting Value (MERV) | MERV 10 @ 472 CFM |

Table 18 below summarizes the data for initial resistance obtained from Blue Heaven Technologies for each of the substrates tested. Graphical representations of the data are provided in FIG. 8A-D.

TABLE 18

| Airflow (CFM) | AFM1 | AFM2 | AFM3 | AFM2X2 |
|---|---|---|---|---|
| 0 | 0.00 | 0.00 | 0.00 | 0.00 |
| 118 | 0.02 | 0.03 | 0.02 | 0.05 |
| 236 | 0.04 | 0.06 | 0.04 | 0.10 |
| 354 | 0.07 | 0.09 | 0.07 | 0.16 |
| 472 | 0.10 | 0.12 | 0.10 | 0.23 |
| 590 | 0.13 | 0.16 | 0.13 | 0.30 |

Table 19 below summarizes the data for particle removal efficiency obtained from Blue Heaven Technologies for each of the substrates tested. Graphical representations of the data are provided in FIGS. 19A-D.

TABLE 19

| Particle Size Range (um) | Geometric Mean Diam. (um) | Initial Particle Removal Efficiency (%) AFM1 | Initial Particle Removal Efficiency (%) AFM2 | Initial Particle Removal Efficiency (%) AFM3 | Initial Particle Removal Efficiency (%) AFM2X2 |
|---|---|---|---|---|---|
| 0.30-0.40 | 0.35 | 0.0 | 0.0 | 0.0 | 0.0 |
| 0.40-0.55 | 0.47 | 0.0 | 0.0 | 0.0 | 0.0 |
| 0.55-0.70 | 0.62 | 0.0 | 0.0 | 0.2 | 7.1 |
| 0.70-1.00 | 0.84 | 2.3 | 6.1 | 3.7 | 18.1 |
| 1.00-1.30 | 1.14 | 15.1 | 20.4 | 16.2 | 36.4 |
| 1.30-1.60 | 1.44 | 21.7 | 28.8 | 22.3 | 45.8 |
| 1.60-2.20 | 1.88 | 28.6 | 37.3 | 29.0 | 57.7 |
| 2.20-3.00 | 2.57 | 43.3 | 53.4 | 42.9 | 74.8 |
| 3.00-4.00 | 3.46 | 58.6 | 66.9 | 57.1 | 87.3 |
| 4.00-5.50 | 4.69 | 65.7 | 73.0 | 63.5 | 91.4 |
| 5.50-7.00 | 6.20 | 70.7 | 75.8 | 66.8 | 92.3 |
| 7.00-10.00 | 8.37 | 69.6 | 76.7 | 70.8 | 93.1 |

Based on the ASHRAE Standard 52.2 test results on AFM-2X2, the following conclusions were derived.

An increase in basis weight of the substrate resulted in a significant improvement in filtration efficiency as represented by the MER value.

For a MERV 10@472 CFM filter, the relatively low initial resistance as expressed in units of Water Gauge may indicate good porosity and, possibly, better energy efficiency associated with operating an air filtration system with substrate AFM-2X2.

Figure 17:
FIG. 17 provides a scanning electron micrograph of NTL3 taken at a magnification of 1500× illustrating dust re-wetting capability of FLEXCRYL® 1625.
Figure 18A:
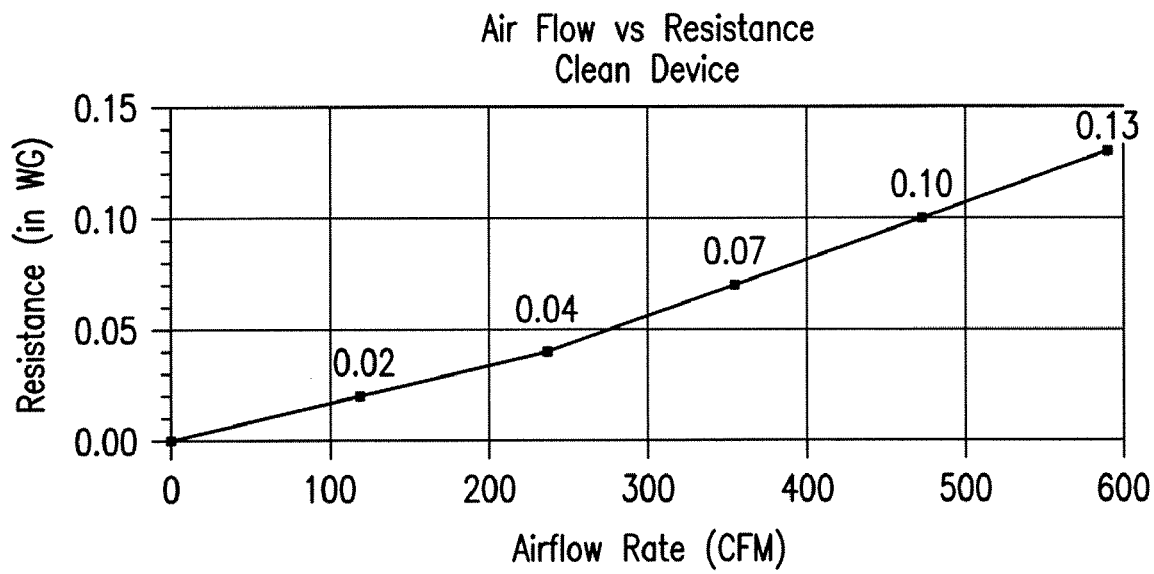
FIGS. 18A-D provide graphical representations of data for initial airflow resistance (in WG) testing for substrates AFM1 (FIG. 18A), AFM2 (FIG. 18B), AFM3 (FIG. 18C), and AFM2X2 (FIG. 18D). Data is provided as Airflow in CFM over resistance in WG.
Figure 18B:
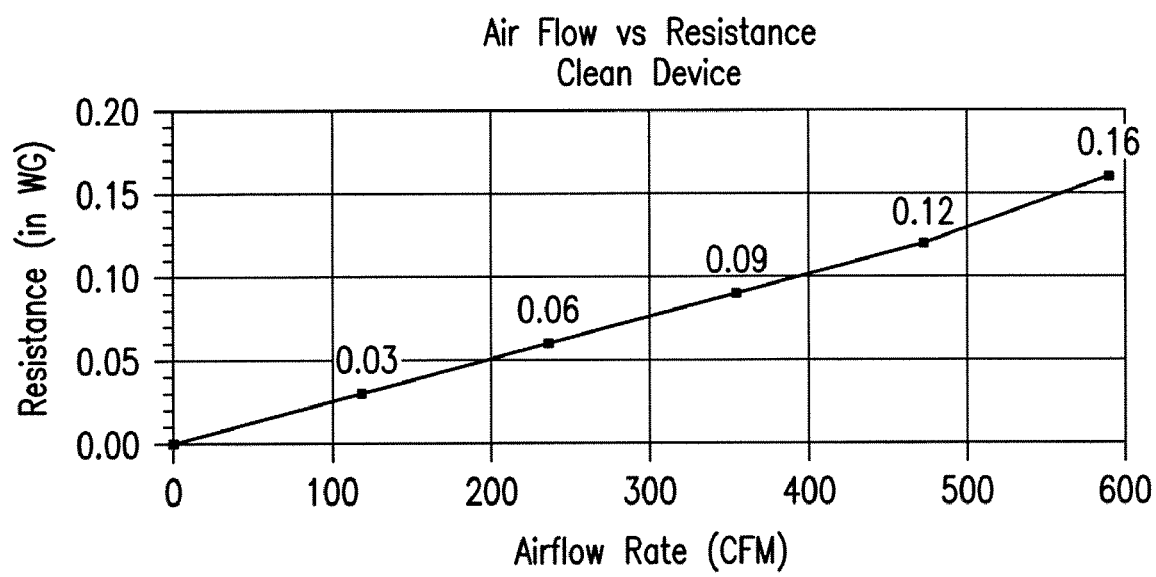
Figure 18C:
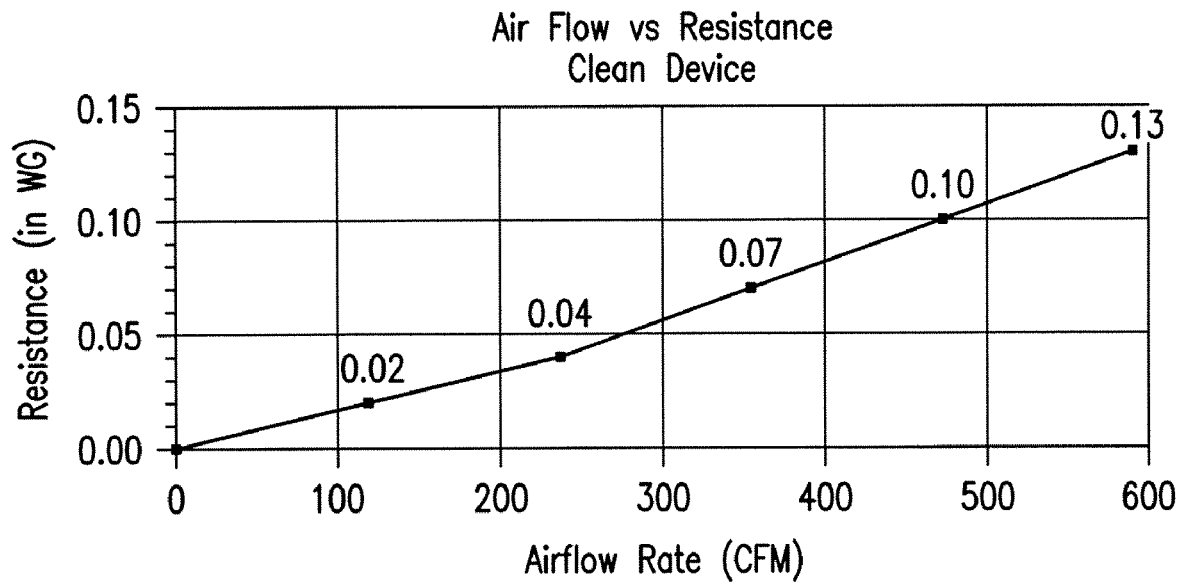
Figure 18D:
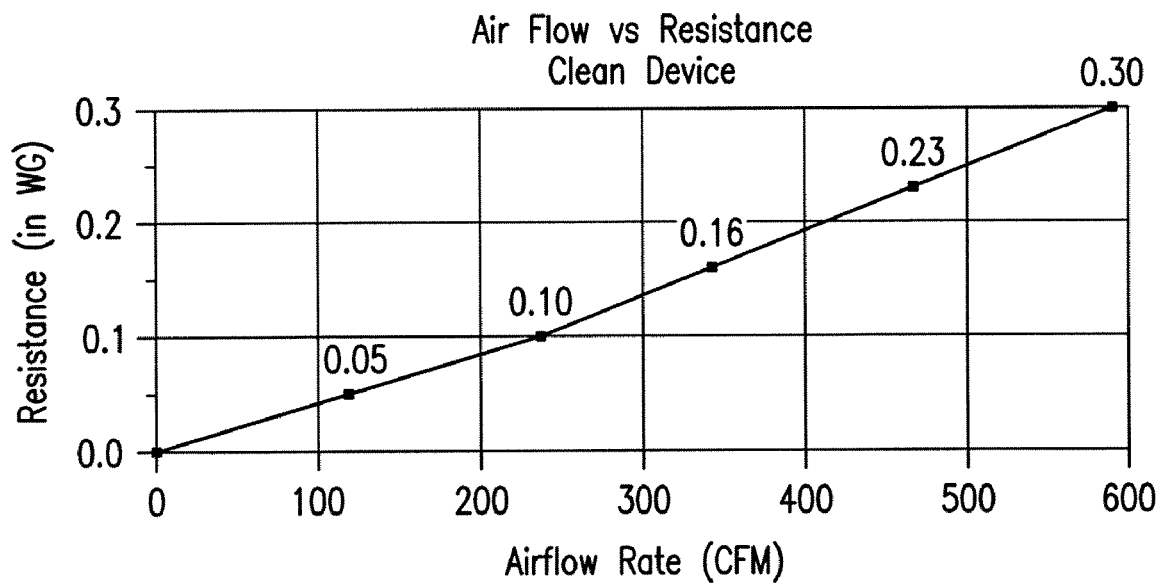
Figure 19A:
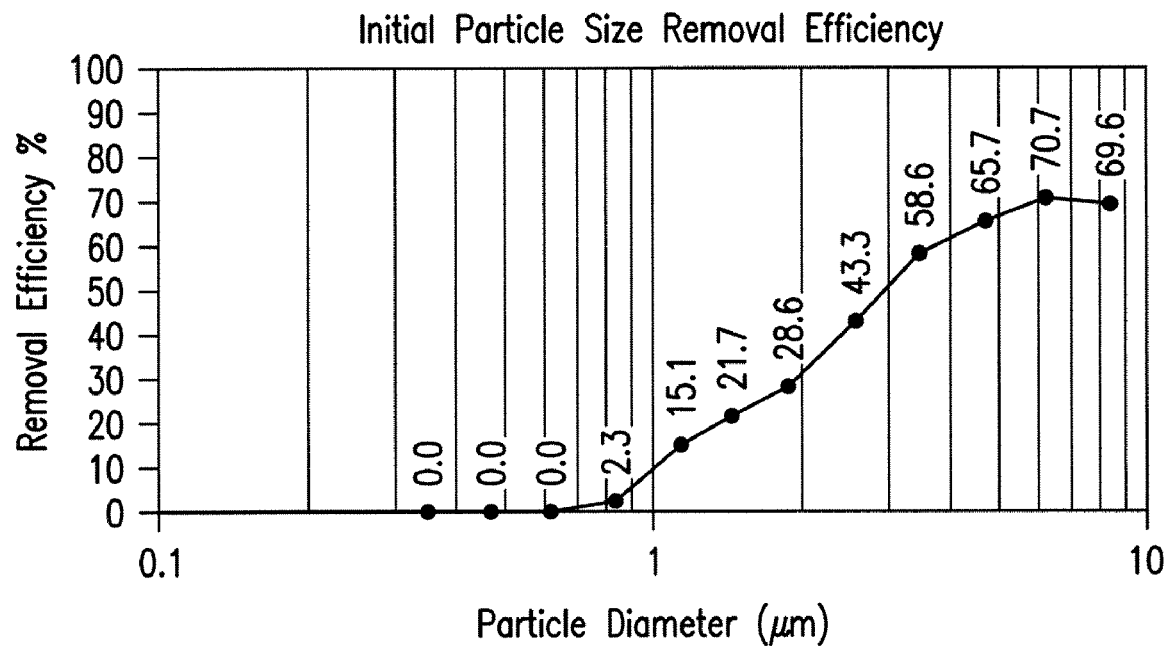
FIGS. 19A-D provide graphical representations of data for particle removal efficiency testing for substrates AFM1 (FIG. 19A), AFM2 (FIG. 19B), AFM3 (FIG. 19C), and AFM2X2 (FIG. 19D). Data is provided as removal efficiency in percentage over particle diameter in micromolar.
Figure 19B:
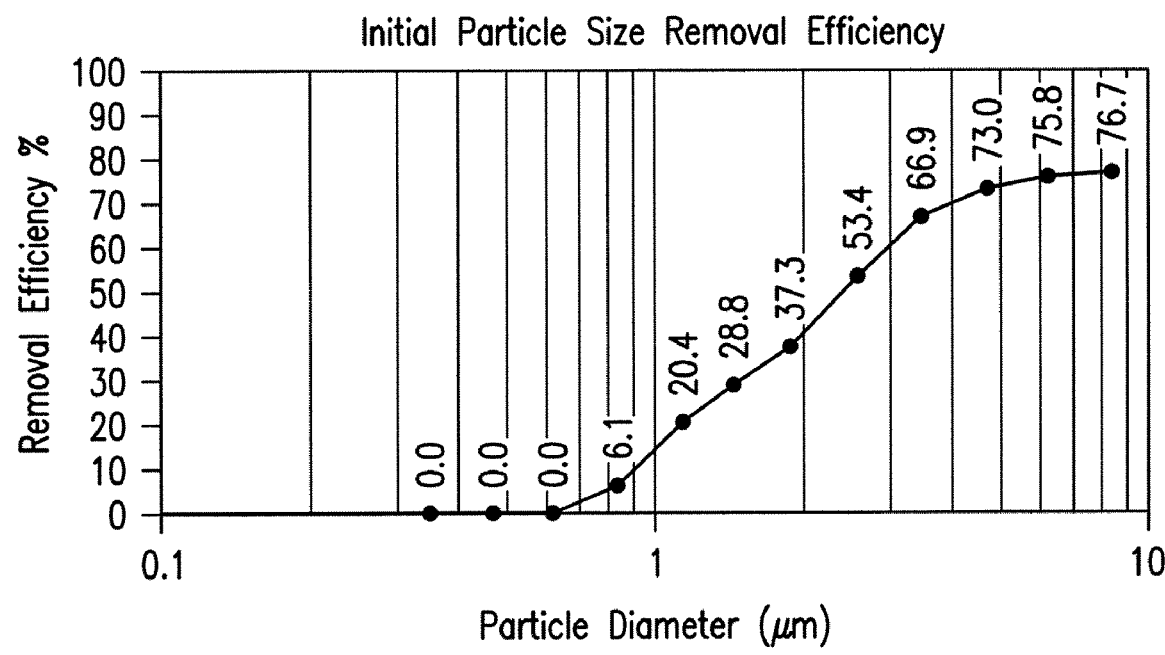
Figure 19C:
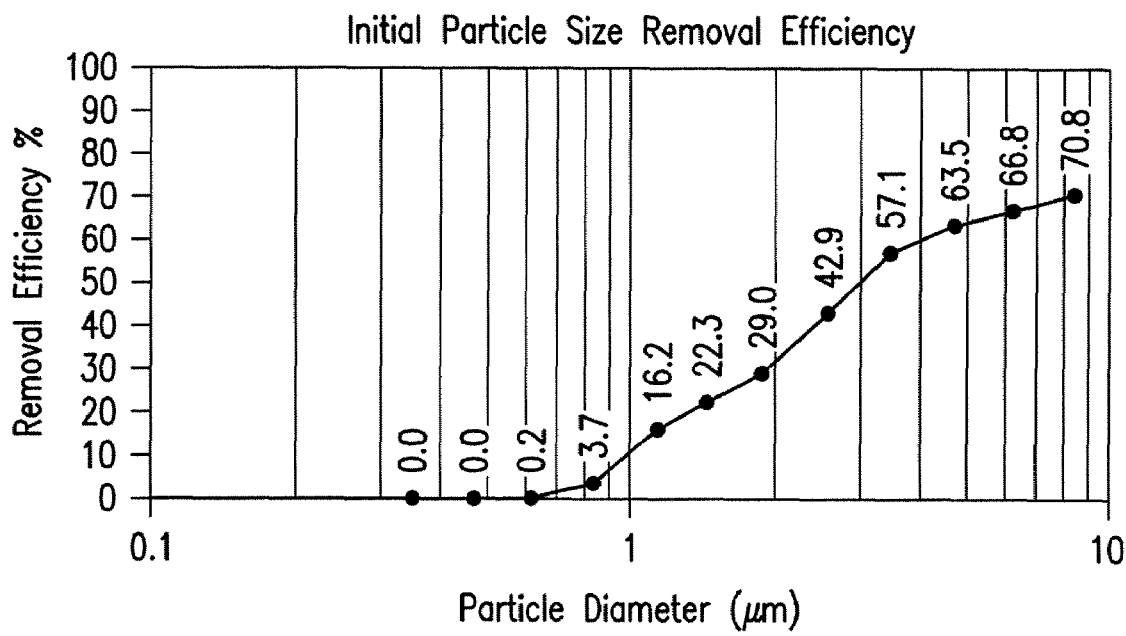
Figure 19D:
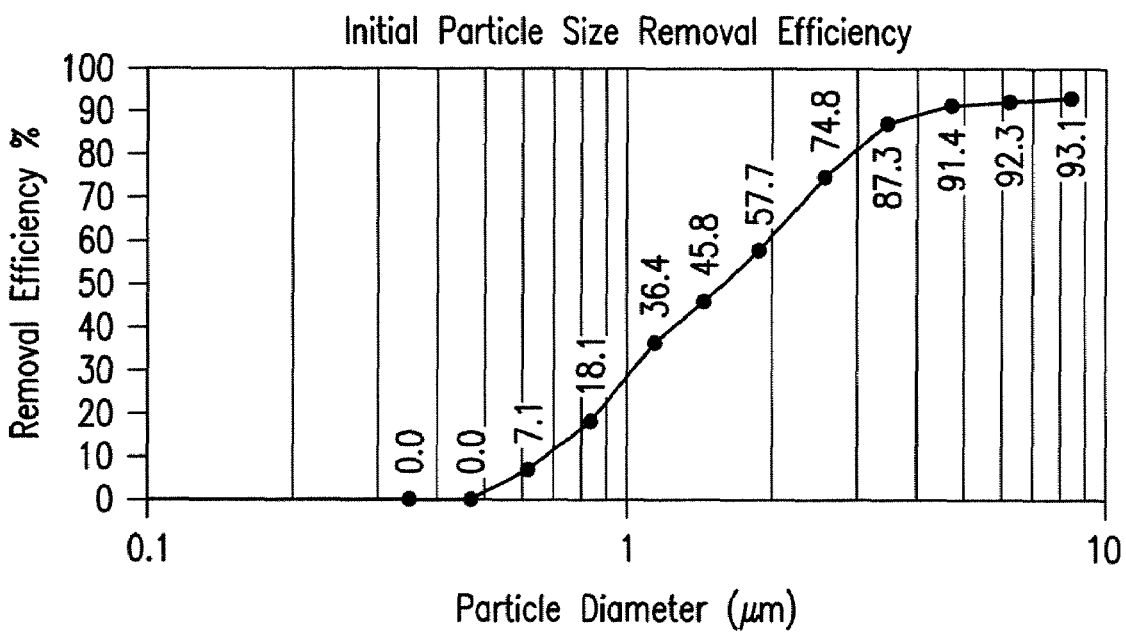

Previous analysis on a similar substrate, NLT3 from Example 2, involved visually examining the dust-capturing characteristics of the pilot plant substrate using the Hitachi S3500-N Variable Pressure Scanning Electron Microscope on-site. Prior to examination, the substrate had been dosed with imitation dust, a silica-based material available as Arizona Test Dust (A.T.D.), manufactured by Powder Technology. This dust is normally used to test filters and has particles that range in size from 0.807-μm to 78.16-μm. The dust-dosed substrate was then sputter-coated with gold using the EMITECH K550x Sputter Coater. Secondary electron images (FIGS. 16 and 17) were captured at an accelerating voltage of 15.0 kV at a working distance of 10-mm.

Based on visual examination, it was concluded at the time that the dust-capturing capacity of the substrate NTL-3 was greater than that predicted merely from the apparent surface area of the fibers comprising the media. The waterborne pressure-sensitive adhesive, FLEXCRYL® 1625, coating the fibers of the NTL3 media appeared to have a re-wetting capability, making it possible to capture a dust particle, and then wet and incorporate that particle into the adhesive. This resulted in that area of the adhesive-coated fiber becoming available again for dust capture.

It was also noted during visual analysis of NTL3 from Example 2, and AFM-1, AFM-2, and AFM-3, that the waterborne pressure-sensitive adhesives, FLEXCRYL® 1625 and the NACOR® 38-088A, that had been sprayed on the web during manufacture of the substrate in the pilot plant, did not remain entirely on the top surface of the substrate, but had penetrated through the pores of the top layer of fibers, settling in the body of the material. Much of this effect can be attributed to the fact that the top layer of Fibervision™ AL 4-Adhesion bicomponent fibers, consisting of a polypropylene core and a polyethylene sheath, is hydrophobic, causing the waterborne adhesive to selectively migrate to the more hydrophilic wood fiber layer underneath. This made it possible to wind the web into a roll in the pilot plant and efficiently unroll it, as the top surface did not exhibit significant tack.

Example 11

Non-Limiting Example of Tacky Material with Multiple Layers

FIG. 1 presents a perspective view of a tacky material 100, in one embodiment. In this arrangement, a multi-strata substrate is employed.

First, a top layer 10 is provided. The top layer 10 represents a nonwoven, airlaid fiber matrix. This layer 10 is not treated with any adhesive or miticide, and is fabricated or made from a soft, cotton linter in order to serve as a sleeping surface. The top strata 10 includes an upper surface on which a user may place a fitted sheet and then lay.

Second, the tacky material 100 includes an upper intermediate nonwoven material layer 20. This upper intermediate stratum 20 has a top surface 22 and a bottom surface 24. The upper intermediate layer 20 is impregnated with an aggressively tacky adhesive for trapping dust mites and other allergens moving into and out of a mattress (not shown).

Third, the tacky material 100 includes a lower intermediate nonwoven material layer 30. This lower intermediate stratum 30 has a top surface 32 and a bottom surface 34. The lower intermediate layer 30 is impregnated with a mildly tacky adhesive, and then lightly treated with a nontoxic miticide.

Fourth, the tacky material 100 includes a release liner 40. The liner 40 defines a thin poly-olefin film which engages the bottom surface 34 of the lower intermediate layer 30. The film 40 is releasable and is removed before the user places the tacky material 100 onto a mattress (or other allergen-bearing article). The film 40 permits multiple tacky material units 100 to be vertically stacked, and then packaged for shipment or sale.

The strata 10, 20, 30 preferably include a binder which permits the strata to be melded together in an oven. Alternatively, or in addition, the strata 10, 20, 30 include a hotmelt adhesive applied to perimeter surfaces for sealing the edges.

A light-weight container 50 is provided for packaging. The light-weight container may be a transparent polyethylene sleeve or plastic bag that is labeled for retail sale. Alternatively, it may be a cardboard box. Alternatively still, the container 50 may be a more durable and stackable polycarbonate container as shown in FIG. 1. Other containers may be employed, and the tacky material 100 is not limited in scope to the method of packaging or shipping. The container 50 includes a water-tight interior 52 for receiving the tacky material 100. A removable sealing member 58 is applied along an upper lip 56 of the container 50 to seal the container 50.

Preferably, the container 50 is smaller in area than the tacky material 100. The tacky material 100 is folded over one or more times before being inserted into the container 50. This permits multiple tacky material units 100 to fit more readily into the container 50.

It is understood that the tacky material 100 of FIG. 1 is merely exemplary; other arrangements and materials consistent with this disclosure may be employed. FIG. 1 is intended to present various features and options together that might more preferably be independent features. For instance, the tacky material might only have a single layer that has a mildly tacky adhesive sprayed onto one exterior surface. The material may be rolled or folded and then inserted into a sleeve for transport. The tacky material might then be carried through a converting process to place it in retail form.

All patents, patent applications, publications, product descriptions and protocols, cited in this specification are hereby incorporated by reference in their entirety. In case of a conflict in terminology, the present disclosure controls.

While it will be apparent that the invention herein described is well calculated to achieve the benefits and advantages set forth above, the present invention is not to be limited in scope by the specific embodiments described herein. It will be appreciated that the invention is susceptible to modification, variation and change without departing from the spirit thereof. For instance, the nonwoven structure is described in the context of an airlaid process. However, non-airlaid processes are also contemplated.

What is claimed is:

1. A filtration medium comprising:
   (a) a nonwoven airlaid multilayer substrate having a basis weight of from about 35 gsm to about 500 gsm comprising, based on the total weight of the substrate, from about 30 weight percent to about 95 weight percent matrix fibers and from about 5 weight percent to about 70 weight percent of a binder comprising
      (A) a first layer comprising synthetic matrix fibers and having a top surface and a bottom surface,
      (B) a second layer having a top surface and a bottom surface, the second layer comprising cellulosic matrix fibers and binder with the top surface of the second layer contacting the bottom surface of the first layer,
   (b) optionally, a dusting layer of latex on the bottom surface of the second layer having an outer surface, and
   (c) a pressure sensitive adhesive.

2. A filtration medium of claim 1, further comprising a scrim having a basis weight of from about 8 gsm to about 200 gsm, wherein the scrim is positioned in contact with the bottom surface of the second layer or the outer surface of the dusting layer.

3. The filtration medium of claim 1, wherein the binder for the matrix fibers is a bicomponent fiber, a latex or a mixture thereof.

4. The filtration medium of claim 1, wherein the synthetic fibers of the first layer are staple synthetic fibers, bicomponent fibers or a mixture thereof.

5. The filtration medium of claim 1, wherein the synthetic fibers of the first layer are bicomponent fibers.

6. The filtration medium of claim 1, wherein the synthetic fibers of the first layer are eccentric bicomponent fibers.

7. The filtration medium of claim 1, wherein the pressure sensitive adhesive is present to a greater extent in the second layer comprising cellulosic fibers and binder than in the first layer containing synthetic fibers.

8. The filtration medium of claim 1, wherein the pressure sensitive adhesive is applied to the top surface of the first layer.

9. The filtration medium of claim 1, wherein the pressure sensitive adhesive is a waterborne adhesive that selectively migrates to the second layer comprising cellulosic fibers so that the top surface of the first layer does not exhibit significant tack.

10. The filtration medium of claim 1, wherein the substrate has a basis weight of from about 35 gsm to about 250 gsm, the substrate comprising, based on the total weight of the substrate, from about 75 weight percent to about 95 weight percent matrix fibers and from about 5 weight percent to about 25 weight percent of a binder.

11. The filtration medium of claim 1, wherein the pressure sensitive adhesive is present as an add on that provides a basis weight for the filtration medium that is from about 10 percent to about 31 percent greater than the basis weight of the substrate.

12. The filtration medium of claim 1, wherein at least a portion of the matrix of fibers are impregnated with the pressure sensitive adhesive.

13. The filtration medium of claim 2, wherein the scrim comprises a spunbond material, a meltblown material, a wet-laid or airlaid nonwoven material, a textile, a woven or nonwoven synthetic material.

14. The filtration medium of claim 1, wherein the substrate contains from about 50 weight percent to about 95 weight percent matrix fibers and from about 5 weight percent to about 50 weight percent of a binder.

15. The filtration medium of claim 1, wherein the substrate has a density of from about 0.035 g/cm$^3$ to about 0.10 g/cm$^3$.

16. The filtration medium of claim 1, wherein the material further comprises a release layer adhered to the pressure-sensitive adhesive.

17. The filtration medium of claim 16, wherein the release layer is paper, fiber, metal foil, polymeric film, or a combination thereof.

18. The filtration medium of claim 16, wherein the release layer is a polymeric film that is one of polyolefin, polyethylene, polyester, and plasticized vinyl films.

19. The filtration medium of claim 16, wherein the release layer is either a woven or nonwoven fiber which has been treated on a surface with a release agent.

20. The filtration medium of claim 1, wherein the pressure sensitive adhesive is present in an amount from about 5 gsm to about 300 gsm.

21. The filtration medium of claim 1, wherein the pressure sensitive adhesive is coextensively contiguous with a major interior or exterior surface of the substrate.

22. The filtration medium of claim 1, wherein the pressure sensitive adhesive is coextensively contiguous with the one or more selected areas of the substrate.

23. The filtration medium of claim 1, wherein the pressure sensitive adhesive is an acrylate, a polyurethane, a poly-alpha-olefin, a silicone, or a self-tacky or tackified natural or synthetic rubber.

24. The filtration medium of claim 1, wherein the pressure sensitive adhesive is an essentially no-tacky adhesive tackified with a resin.

25. The filtration medium of claim 24, wherein the pressure sensitive adhesive is a substantially non-tacky acrylate tackified with a rosin ester, an aliphatic resin, or a terpene resin.

* * * * *